(12) United States Patent
Jung

(10) Patent No.: US 11,733,811 B1
(45) Date of Patent: Aug. 22, 2023

(54) INPUT APPARATUS AND CONTROL METHOD THEREOF

(71) Applicant: Woo Yeol Jung, Jeollanam-do (KR)

(72) Inventor: Woo Yeol Jung, Jeollanam-do (KR)

( * ) Notice: Subject to any disclaimer, the term of this patent is extended or adjusted under 35 U.S.C. 154(b) by 0 days.

(21) Appl. No.: 18/302,456

(22) Filed: Apr. 18, 2023

(30) Foreign Application Priority Data

Apr. 25, 2022 (KR) .......................... 10-2022-0050720

(51) Int. Cl.
*G06F 3/044* (2006.01)
*G06F 3/04886* (2022.01)
*G06F 3/041* (2006.01)

(52) U.S. Cl.
CPC ............ *G06F 3/044* (2013.01); *G06F 3/0416* (2013.01); *G06F 3/04886* (2013.01)

(58) Field of Classification Search
None
See application file for complete search history.

(56) References Cited

U.S. PATENT DOCUMENTS

2017/0250460 A1* 8/2017 Shin ..................... H04M 1/0277
2021/0193012 A1* 6/2021 Jung ..................... H01Q 13/10

FOREIGN PATENT DOCUMENTS

KR 10-2019-0130140 A 11/2019

* cited by examiner

*Primary Examiner* — Stephen T. Reed
(74) *Attorney, Agent, or Firm* — KORUS Patent, LLC; Seong Il Jeong

(57) ABSTRACT

The present disclosure relates to an input apparatus and a control method thereof, and the input apparatus includes a pair of bases having one sides facing each other and rotatably coupled by a hinge part, which forms a horizontal rotation center, and each having an installation groove formed in an upper surface, a touch input unit, a control unit provided in each of the bases, and configured to transmit the finger input signal to the electronic device, a power supply unit provided in each of the bases to be rechargeable or replaceable and configured to supply power to the control unit, a plurality of function selection units provided on a side surface of each of the bases, electrically connected to the control unit, and configured to transmit a selection signal to the control unit when one or more pressing operations are performed.

11 Claims, 30 Drawing Sheets

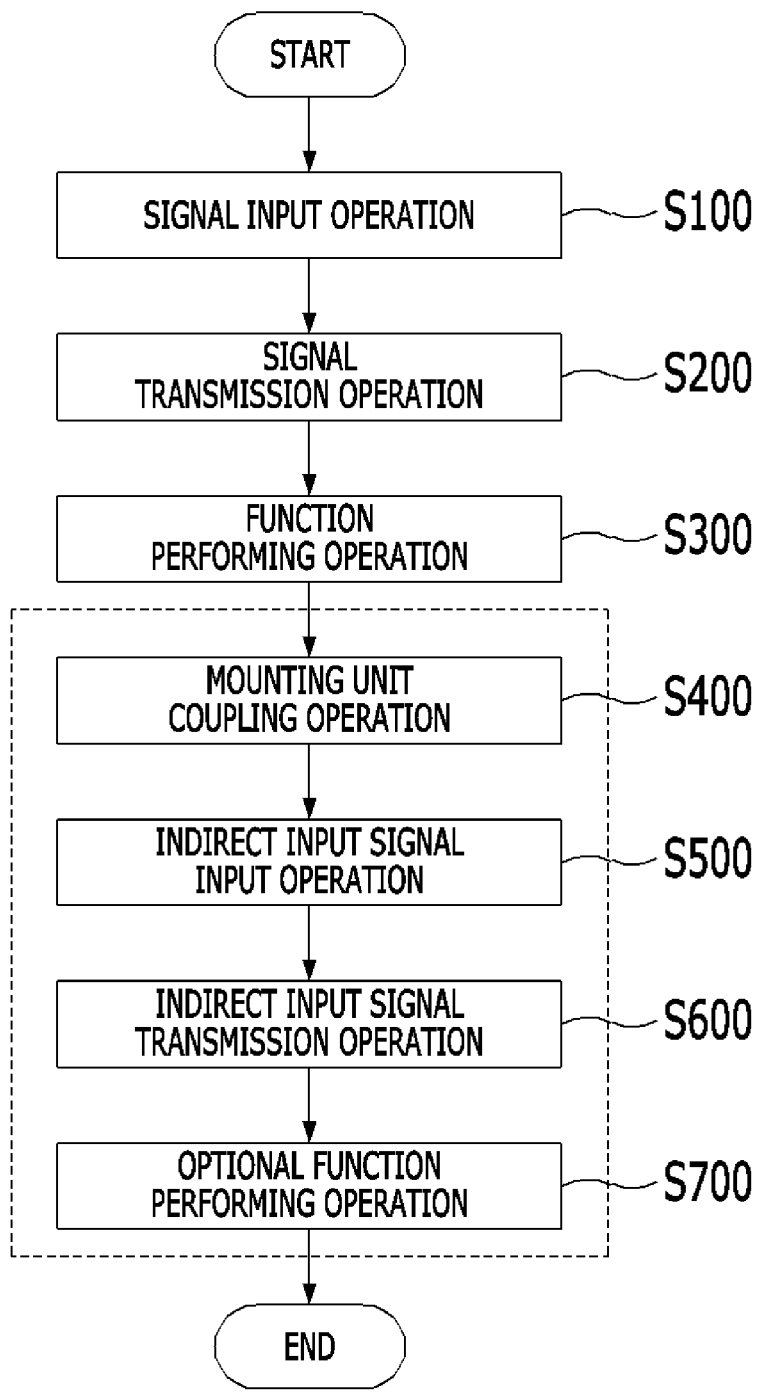

INPUT APPARATUS AND CONTROL METHOD THEREOF

CROSS-REFERENCE TO RELATED APPLICATION

This application claims priority to and the benefit of Korean Patent Application No. 2022-0050720, filed on Apr. 25, 2022, the disclosure of which is incorporated herein by reference in its entirety.

BACKGROUND

1. Field of the Invention

The present disclosure relates to an input apparatus and a control method thereof, and more particularly, to an input apparatus capable of improving the diversity and convenience of use by using a touch input unit to input a finger input signal and an auxiliary input unit to input an indirect input signal.

2. Discussion of Related Art

In general, input apparatuses such as keyboards use a method of inputting signals by pressing a plurality of key buttons so that letters, numbers, symbols, and the like can be combined and input with designated buttons and are classified into an electronic type and a mechanical type according to operation principles.

Recently, a technology that applies a touch panel with a certain area to a part of an input apparatus has been proposed. Conventional touch panels have an operating method of inputting signals using a hand or a touch means (such as a pen), and can be classified as resistive-film, light-sensitive, and capacitive touch panels according to the method of implementation.

Among these, the capacitive touch panel converts the contact position into an electrical signal by detecting the change in capacitance that the conductive sensing pattern forms with other sensing patterns or ground electrodes in the vicinity when the hand or touch means comes into contact therewith.

However, the conventional touch screens share a screen unit and an input unit and thus are small in size, have difficulty in operating in a 3D environment in which the entire field of view of a user becomes a control area since the screen unit has to be controlled, and are suitable for screen devices used in existing input apparatuses such as keyboards, mice, console game controllers, and the like, which are used by the user by checking an input position through a user's vision, but are not suitable for controlling in a three-dimensional space in which a virtual reality electronic device (VR device) is operated in a state in which the field of view of the user is blocked and the entire field of view in augmented reality becomes a control space. Existing VR motion sensing input apparatuses have simple buttons, which limited the sharing of functions with existing input apparatuses, making it impossible to use various programs, and are inconvenient for safe use and portability due to limitations in space for the user to use while moving his/her body.

Prior art literature related to the present disclosure includes Korean Patent Application Publication No. 10-2013-0134981 (published on Dec. 10, 2013) which discloses a keyboard integrated with a touch pad having mouse and multi-touch functions.

SUMMARY OF THE INVENTION

The present disclosure is directed to providing an input apparatus in which the sensation of fingers is utilized as a push input and a touch input of a touch input unit, the input apparatus capable of improving the diversity and convenience of using existing input apparatuses and new functions by allowing a virtual reality device and an augmented reality device in real space to be carried without space limitations by utilizing an interface in a virtual space even when the field of view is blocked, being controlled in a three-dimensional space and used, setting a function input area of existing input apparatus (a keyboard, a mouse, a console game machine, or a touch pad), and utilizing function conversion according to the appearance of the device due to the combination of a motion sensing function of a gyro sensor and an auxiliary input unit.

According to an aspect of the present disclosure, there is provided an input apparatus including a pair of bases having one sides facing each other and rotatably coupled by a hinge part, which forms a horizontal rotation center, and each having an installation groove formed in an upper surface, a touch input unit provided in the installation groove to form a finger touch area of a user and configured to detect a finger input signal in a capacitive manner when a finger comes into contact therewith, a control unit provided in each of the bases, connected to an electronic device by a communication module, and configured to transmit the finger input signal to the electronic device, a power supply unit provided in each of the bases to be rechargeable or replaceable and configured to supply power to the control unit, a plurality of function selection units provided on a side surface of each of the bases, electrically connected to the control unit, and configured to transmit a selection signal to the control unit when one or more pressing operations are performed, one or more mounting units each having a gripping groove formed on a front surface to allow the base to be correspondingly inserted, and an upper body formed on an upper portion of the gripping groove and positioned on an upper surface of the base when the base is inserted into the gripping groove, and one or more auxiliary input units provided on an upper portion of the upper body to form a seating area of a human body, and configured to transmit an indirect input signal to the touch input unit by an electrostatic method when the human body is seated thereon.

In addition, the touch input unit may include a first insulating plastic provided on a lower surface of the installation groove, a first touch sensor stacked and connected to an upper surface of the first insulating plastic, a first conductive member stacked and connected to an upper surface of the first touch sensor, a second insulating plastic made of a non-conductive material and stacked on an upper surface of the first conductive member, a plurality of lifting holes vertically passing through the second insulating plastic, a conductive elastic pad positioned within a thickness of the second insulating plastic and having a plurality of elastic deformation areas respectively positioned in the lifting holes to be spaced apart from an upper portion of the first conductive member, a first operation unit provided to be liftable in the lifting hole and having a lower end that presses the elastic deformation area downward to connect the elastic deformation area to the upper surface of the first conductive member when the first operation unit descends to a lower connection position, and a conductive touch unit positioned to be spaced apart from an upper portion of the second insulating plastic and stacked and connected to an upper end of the first operation unit.

In addition, the first operation unit may include a lifting rod positioned on an upper portion of the elastic deformation area to be liftable, having a side portion from which a locking protrusion protrudes, and configured to press the elastic deformation area downward when descending to the connection position, a locking step protruding from an inner circumferential surface of the lifting hole and through which a lower end of the lifting rod vertically passes, and an elastic member provided between the locking step and the locking protrusion and configured to elastically support a lower end of the locking protrusion upward, and the conductive touch unit may include a first conductive touch pad positioned to be spaced apart from the upper portion of the second insulating plastic and having a lower surface stacked and connected to an upper end of the lifting rod, a second touch sensor stacked and connected to an upper surface of the first conductive touch pad, a second conductive touch pad stacked and connected to an upper surface of the second touch sensor, and a conductive fiber stacked and connected to an upper surface of the second conductive touch pad to form the finger touch area.

In addition, the auxiliary input unit may include a lifting space concavely formed below the upper body, an auxiliary lifting hole vertically passing through the upper body and having a lower portion connected to the lifting space, an auxiliary lifting rod provided in the auxiliary lifting hole to be liftable, horizontally movable, and horizontally rotatable and having a lower end connected to the conductive touch unit when descending to the connection position, a lower auxiliary locking protrusion that laterally protrudes from the lower end of the auxiliary lifting rod to be positioned in the lifting space, and is positionally locked on an upper surface of the lifting space when the auxiliary lifting rod is lifted to a connection release position, a support panel seated on an upper surface of the upper body to be horizontally movable, and having an upper fastening hole vertically passing therethrough so that the auxiliary lifting rod vertically passes through the upper fastening hole, an upper auxiliary locking protrusion laterally protruding from an upper end of the auxiliary lifting rod and positioned to be spaced apart from an upper portion of the support panel, and a first auxiliary elastic member provided between the support panel and the upper auxiliary locking protrusion and configured to elastically support a lower end of the upper auxiliary locking protrusion upward so that the auxiliary lifting rod is lifted and returned to the connection release position.

In addition, the input apparatus may further include an accommodation groove concavely formed in an upper surface of the support panel and having an upper fastening hole positioned in an inner area thereof, wherein the first auxiliary elastic member may be positioned inside the accommodation groove, and may elastically support a lower surface of the accommodation groove and the lower end of the upper auxiliary locking protrusion in a vertical direction.

In addition, the upper auxiliary locking protrusion may further include a conductive rubber that is lifted in the inner area of the accommodation groove, coupled to the upper surface of the support panel to cover an upper portion of the accommodation groove, and provided to be elastically deformable to allow a pressing operation to be performed thereon.

In addition, the input apparatus may further include a guide groove concavely formed along an inner circumferential surface of the auxiliary lifting hole, a sliding panel having a disk shape, provided in the guide groove to be horizontally movable, and having a lower fastening hole vertically passing therethrough so that the auxiliary lifting rod vertically passes through the lower fastening hole, and a second auxiliary elastic member provided in the guide groove, spirally wound around the auxiliary lifting rod, and configured to elastically support an outer circumferential surface of the sliding panel in a direction of the auxiliary lifting rod.

In addition, the input apparatus may further include a lower slide groove concavely formed in a lower surface of each of the bases, having a length in an axial direction of the hinge part, and having one side or both sides in a longitudinal direction open in the axial direction of the hinge part, a lower slide protrusion protruding upward from a lower surface of the gripping groove so as to be correspondingly inserted into the lower slide groove and slidably coupled to the lower slide groove through the one side in a longitudinal direction in a male-female manner, a pair of vertical separation prevention grooves concavely formed respectively in both sides of the lower slide groove in a width direction, and a pair of vertical separation prevention protrusions protruding respectively from both sides of the lower slide protrusion in the width direction so as to be inserted into the vertical separation prevention grooves in a male-female manner.

In addition, the input apparatus may further include a side slide groove that is concavely formed in each of the one sides of the bases facing each other, has a length in an axial direction of the hinge part, and has one side or both sides in a longitudinal direction open in the axial direction of the hinge part, and a pair of horizontal separation prevention grooves concavely formed respectively in both sides of the side slide groove in a width direction, wherein the hinge part may further include a first rotating member having a first gear that is provided to be rotatable around the horizontal rotation center and has a length in an axial direction, and a first side slide protrusion that is connected to one side of the first gear in a width direction, has a length in the axial direction of the first gear, and is slidably coupled to the side slide groove through the one side in the longitudinal direction in a male-female manner, a second rotating member having a second gear that is provided to be rotatable around the horizontal rotation center so as to be rotated by being engaged with the first gear and has a length in an axial direction, and a second side slide protrusion that is connected to one side of the second gear in a width direction, has a length in the axial direction of the second gear, and is slidably coupled to the side slide groove through the other side in the longitudinal direction in a male-female manner, a pair of first horizontal separation prevention protrusions protruding from both sides of the first side slide protrusion in a width direction so as to be inserted into the horizontal separation prevention grooves, respectively, in a male-female manner, and a pair of second horizontal separation prevention protrusions protruding from both sides of the second side slide protrusion in a width direction so as to be inserted into the horizontal separation prevention grooves, respectively, in a male-female manner.

In addition, the input apparatus may further include an auxiliary mounting unit on which one of the bases is mounted, wherein the auxiliary mounting unit may include a mounting hole having a length at both sides thereof, a mounting groove concavely formed in an upper surface of the mounting hole so that the base is correspondingly inserted thereto and having a front surface and one side surface open, an auxiliary mounting protrusion that protrudes upward from a lower surface of the mounting groove, has a length in a front-back direction, and is slidably coupled to the side slide groove through the one side in the longitudinal direction in a male-female manner, and an operation switch operably provided on a rear surface of the mounting hole, and electrically connected to the control unit when the base is coupled to the mounting groove.

According to another aspect of the present disclosure, there is provided a method of controlling an input apparatus, the method including a signal input operation of inputting a finger input signal to a control unit when a finger comes into contact with a touch input unit provided on an upper surface of a base, a signal transmission operation of generating a control signal by the control unit according to the finger input signal, and then transmitting the control signal to an electronic device by a communication module, and a function performing operation of displaying a function set in the electronic device through a display window according to the transmitted control signal, wherein the touch input unit detects the finger input signal in a first finger input mode (touch) when being touched by the finger of a user with a set pressure or less, and detects the finger input signal in a second finger input mode (press) when being in contact with the finger with the set pressure or more.

In addition, the method may further include a mounting unit coupling operation of electrically connecting an auxiliary input unit and the control unit by coupling a mounting unit having the auxiliary input unit to the base, an indirect input signal input operation of inputting an indirect input signal to the control unit when the auxiliary input unit is operated, an indirect input signal transmission operation of generating the control signal by the control unit according to the input indirect input signal and then transmitting the indirect input signal to the electronic device by the communication module, and an optional function performing operation of displaying the function set in the electronic device through the display window according to the transmitted indirect input signal.

BRIEF DESCRIPTION OF THE DRAWINGS

The above and other objects, features, and advantages of the present disclosure will become more apparent to those of ordinary skill in the art by describing exemplary embodiments thereof in detail with reference to the accompanying drawings, in which:

FIG. 32 is a block diagram for showing a method controlling an input apparatus according to a second embodiment of the present disclosure.

DETAILED DESCRIPTION OF EXEMPLARY EMBODIMENTS

Hereinafter, exemplary embodiments of the present disclosure will be described in detail with reference to the accompanying drawings.

Advantages and features of the present disclosure and implementation methods thereof will be clarified through the following embodiments described with reference to the accompanying drawings.

However, the present disclosure is not limited to the following embodiments but may be implemented in various different forms. The embodiments are provided only to complete the present disclosure and to fully provide a person having ordinary skill in the art to which the present disclosure pertains with the category of the present disclosure, and the present disclosure will be defined by the appended claims.

In addition, details of generally-known technology that make the subject matter of the present disclosure unclear will be omitted in the following description.

Figure 1:
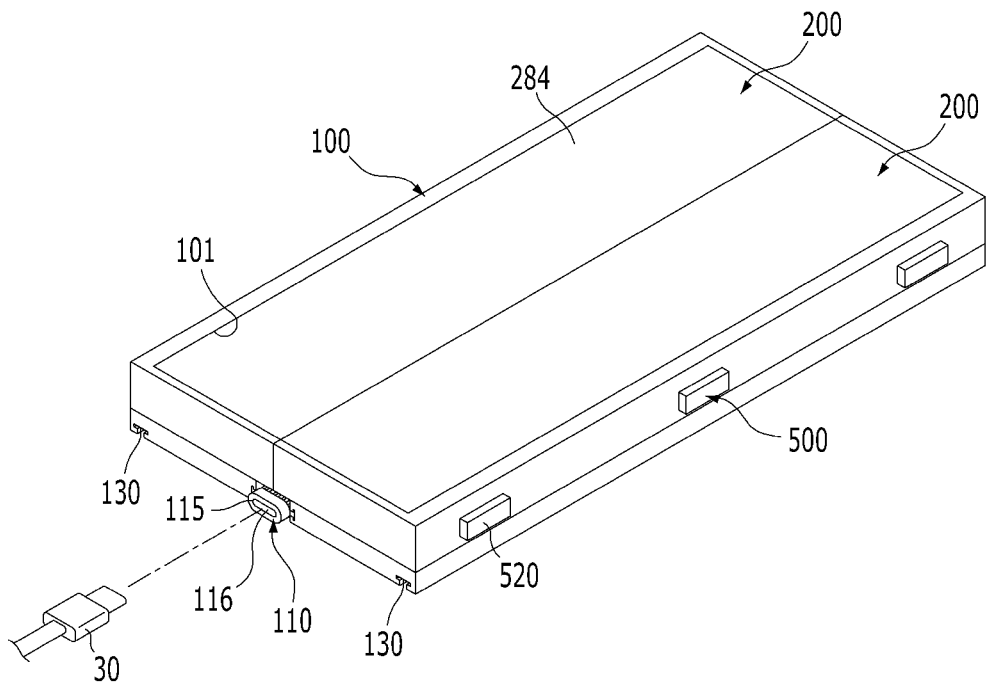
FIG. 1 is a perspective view for showing an input apparatus according to a first embodiment of the present disclosure.
Figure 2:
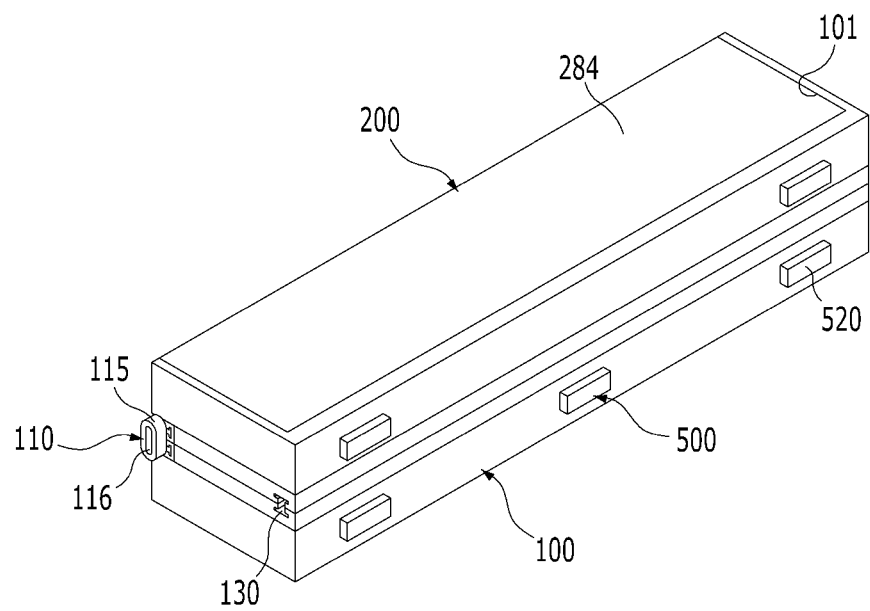
FIG. 2 is a perspective view for showing a folded state of bases of the input apparatus according to the first embodiment of the present disclosure.
Figure 3:
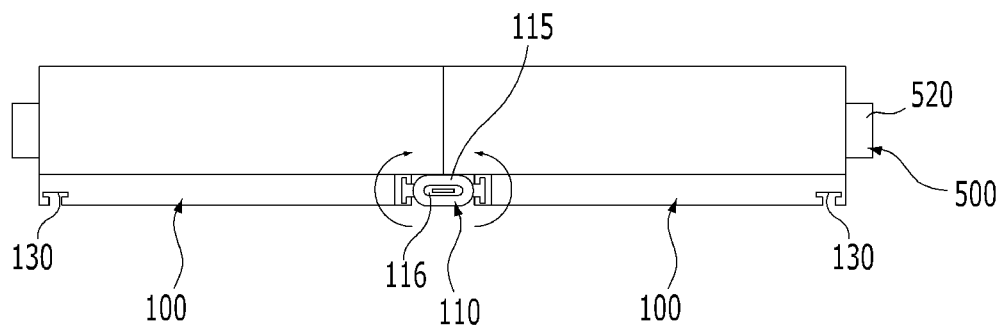
FIG. 3 is a front view for showing the input apparatus according to the first embodiment of the present disclosure.
Figure 4:
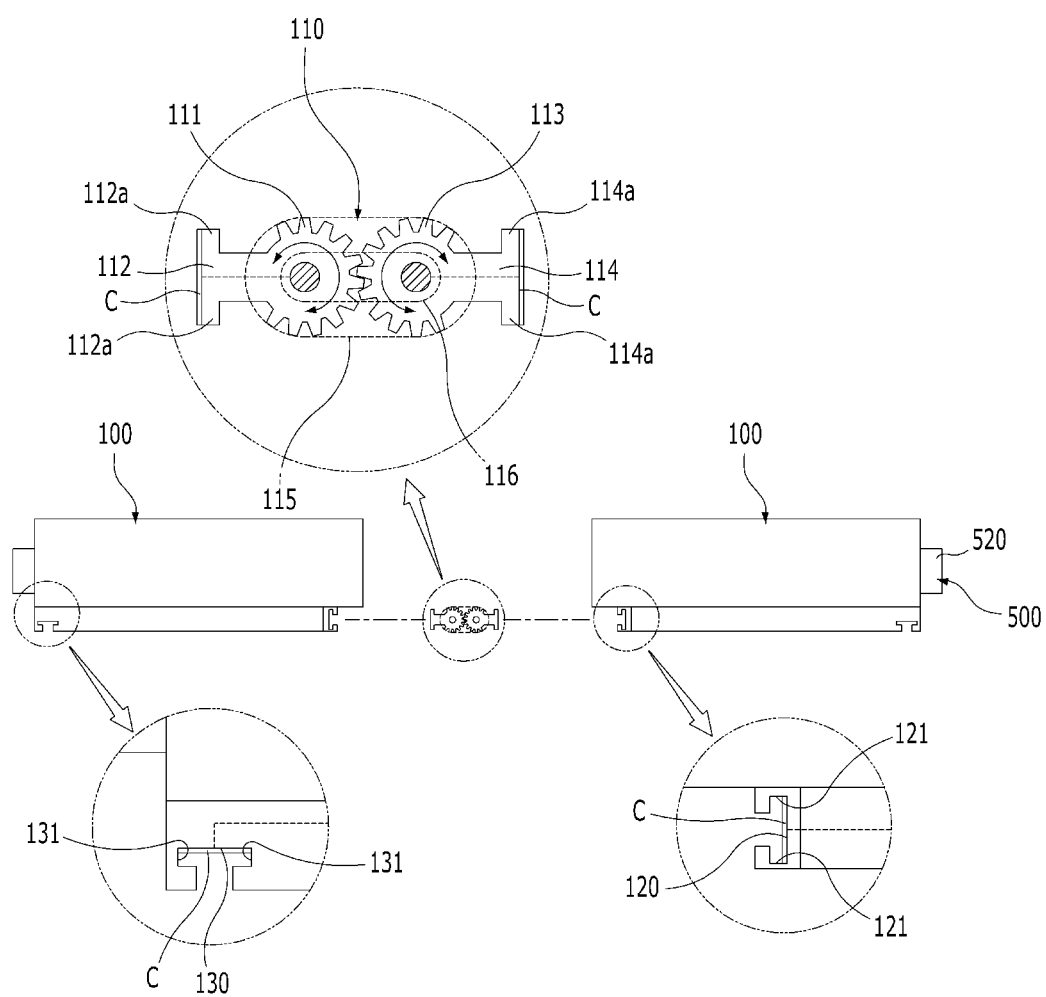
FIG. 4 is a front view for showing a state in which the bases and a hinge part of the input apparatus according to the first embodiment of the present disclosure are separated.
Figure 5:
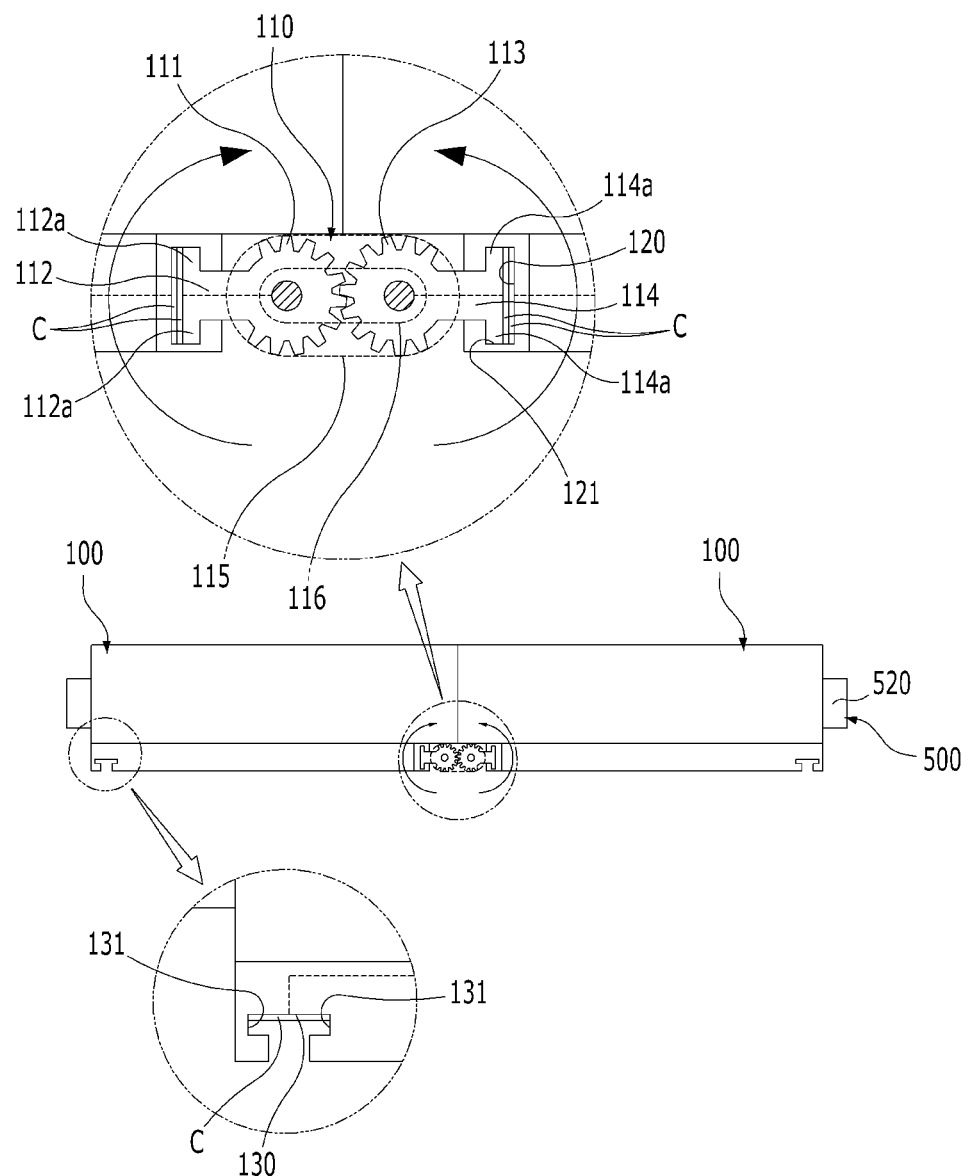
FIG. 5 is a front view for showing an unfolded state of the hinge part of the input apparatus according to the first embodiment of the present disclosure.
Figure 6:
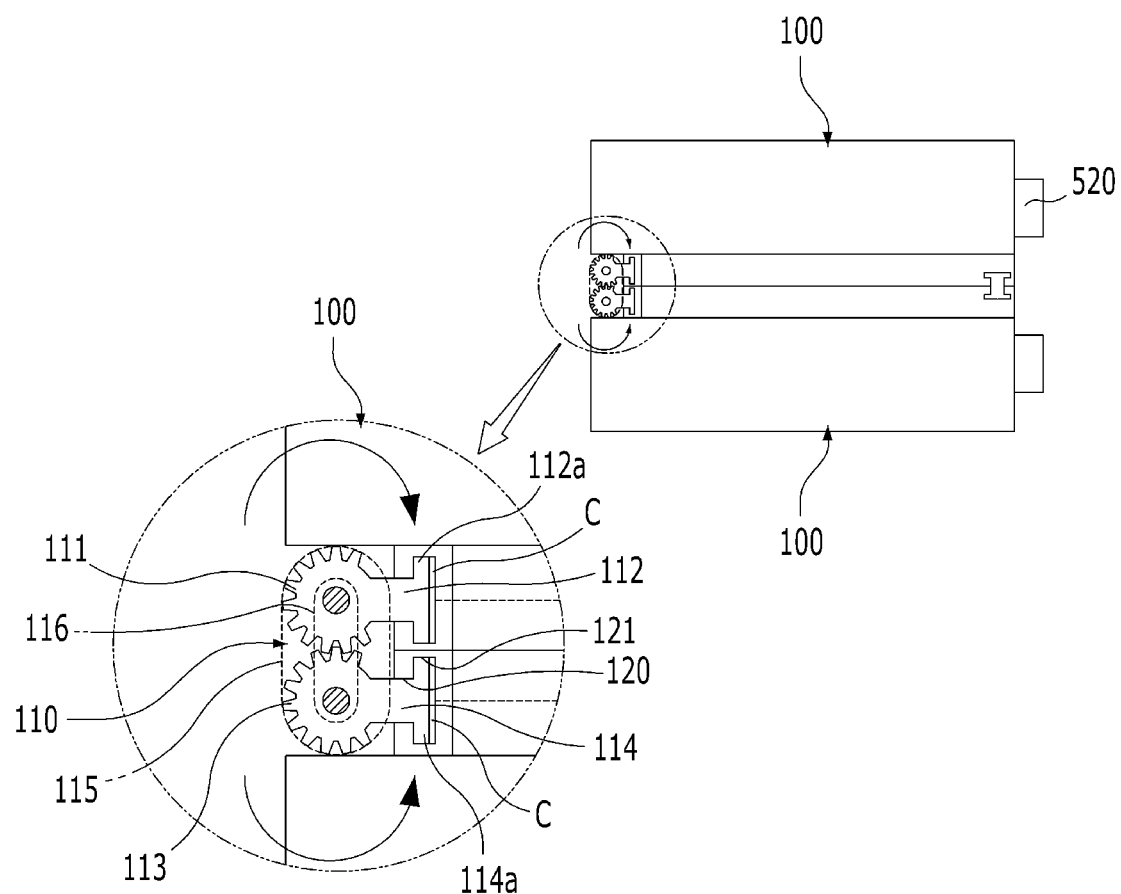
FIG. 6 is a cross-sectional view for showing a folded state of the hinge part of the input apparatus according to the first embodiment of the present disclosure as viewed from a front direction.
Figure 7:
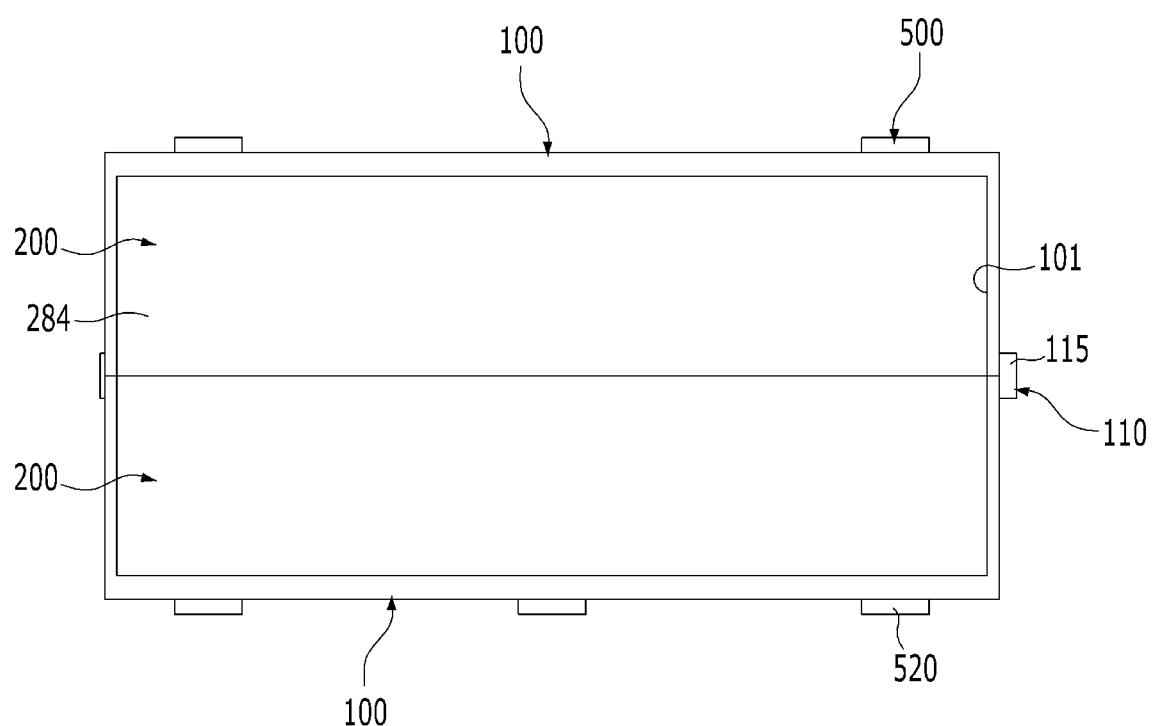
FIG. 7 is a plan view for showing the input apparatus according to the first embodiment of the present disclosure.
Figure 8:
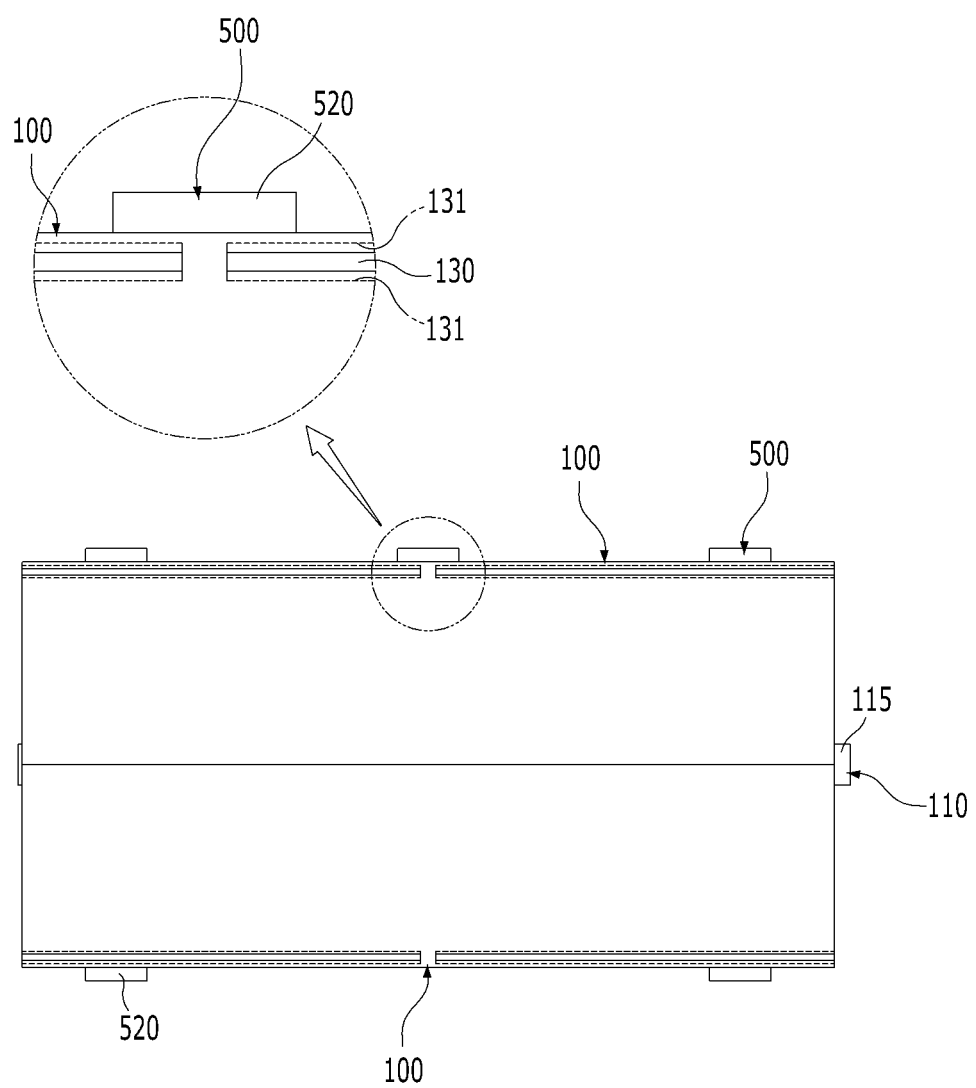
FIG. 8 is a bottom view for showing the input apparatus according to the first embodiment of the present disclosure.
Figure 9:
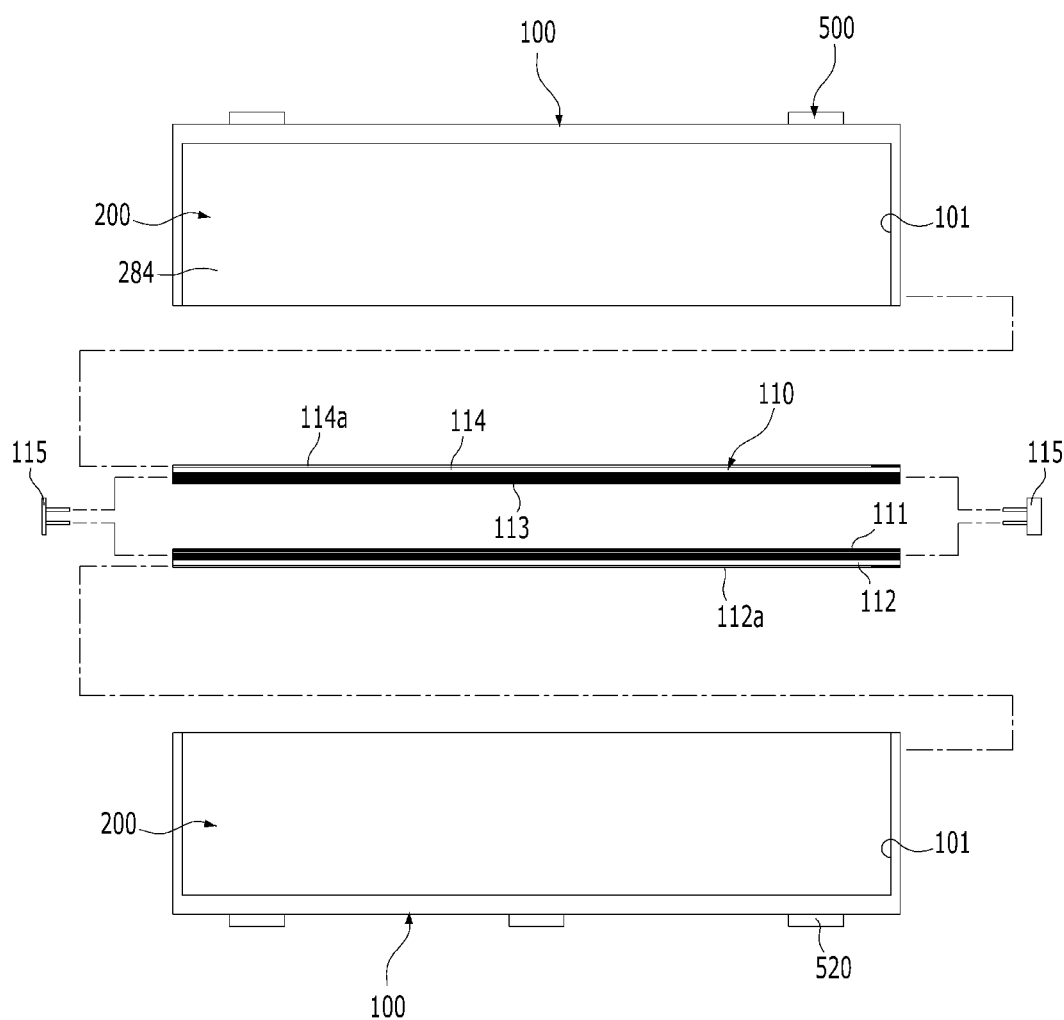
FIG. 9 is a plan view for showing a state in which the bases and the hinge part of the input apparatus according to the first embodiment of the present disclosure are separated from each other.

FIG. 1 is a perspective view for showing an input apparatus according to a first embodiment of the present disclosure, FIG. 2 is a perspective view for showing a folded state of bases of the input apparatus according to the first embodiment of the present disclosure, FIG. 3 is a front view for showing the input apparatus according to the first embodiment of the present disclosure, FIG. 4 is a front view for showing a state in which the bases and a hinge part of the input apparatus according to the first embodiment of the present disclosure are separated, FIG. 5 is a front view for showing an unfolded state of the hinge part of the input apparatus according to the first embodiment of the present disclosure, FIG. 6 is a cross-sectional view for showing a folded state of the hinge part of the input apparatus according to the first embodiment of the present disclosure as viewed from a front direction, FIG. 7 is a plan view for showing the input apparatus according to the first embodiment of the present disclosure, FIG. 8 is a bottom view for showing the input apparatus according to the first embodiment of the present disclosure, and FIG. 9 is a plan view for showing a state in which the bases and the hinge part of the input apparatus according to the first embodiment of the present disclosure are separated from each other.

Figure 10:
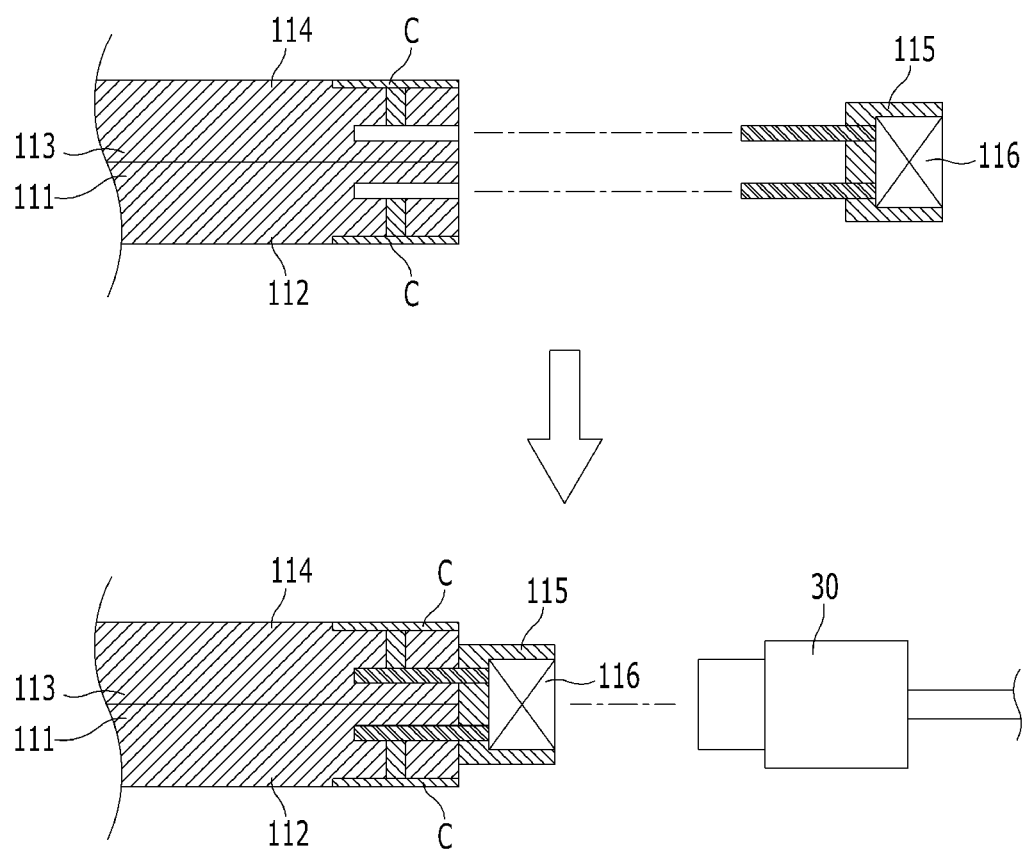
FIG. 10 is a cross-sectional view for showing the hinge part of the input apparatus according to the first embodiment of the present disclosure in a plan view.
Figure 11:
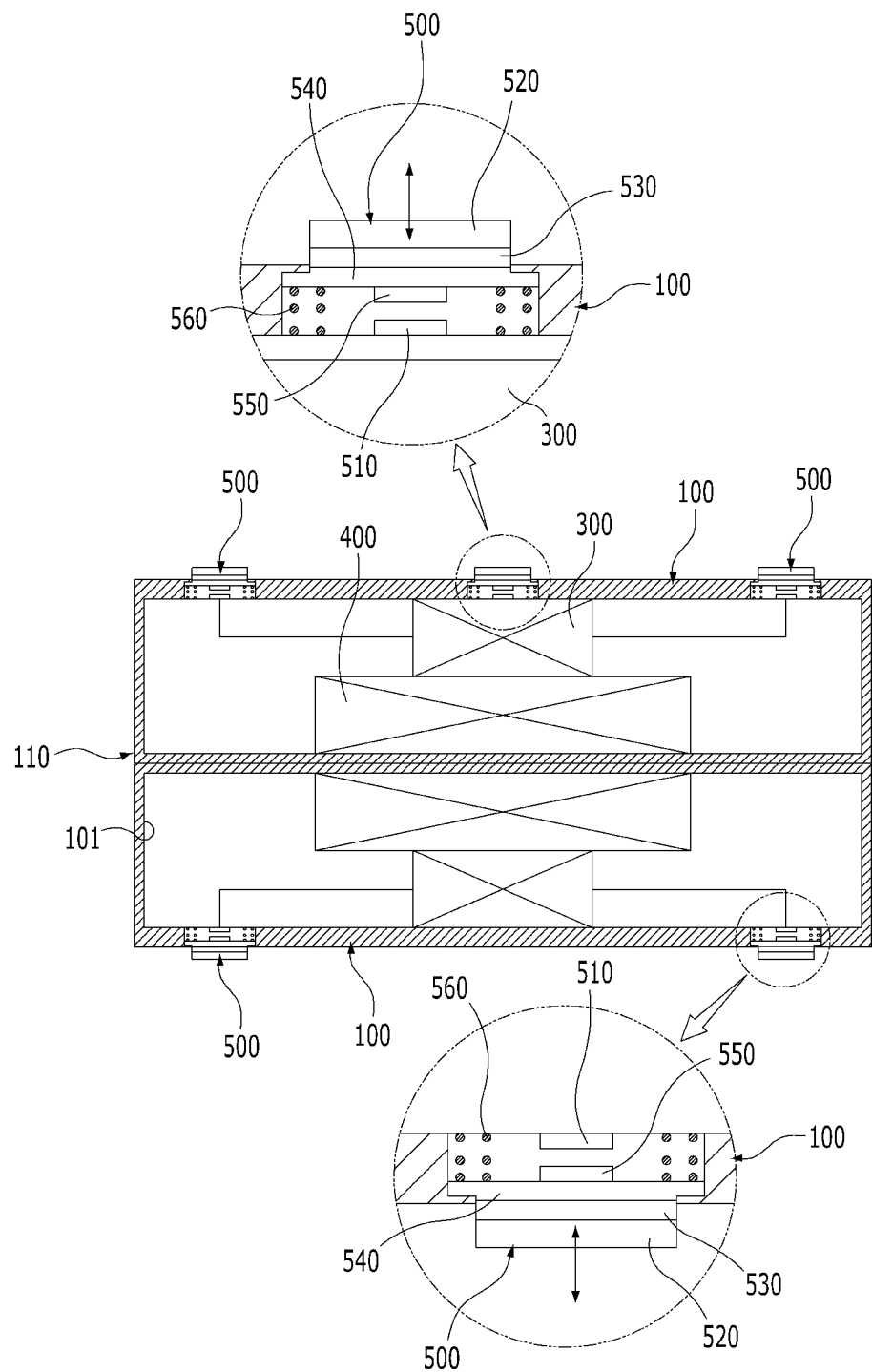
FIG. 11 is a cross-sectional view for showing a function selection unit of the input apparatus according to the first embodiment of the present disclosure as viewed from a bottom direction.
Figure 12:
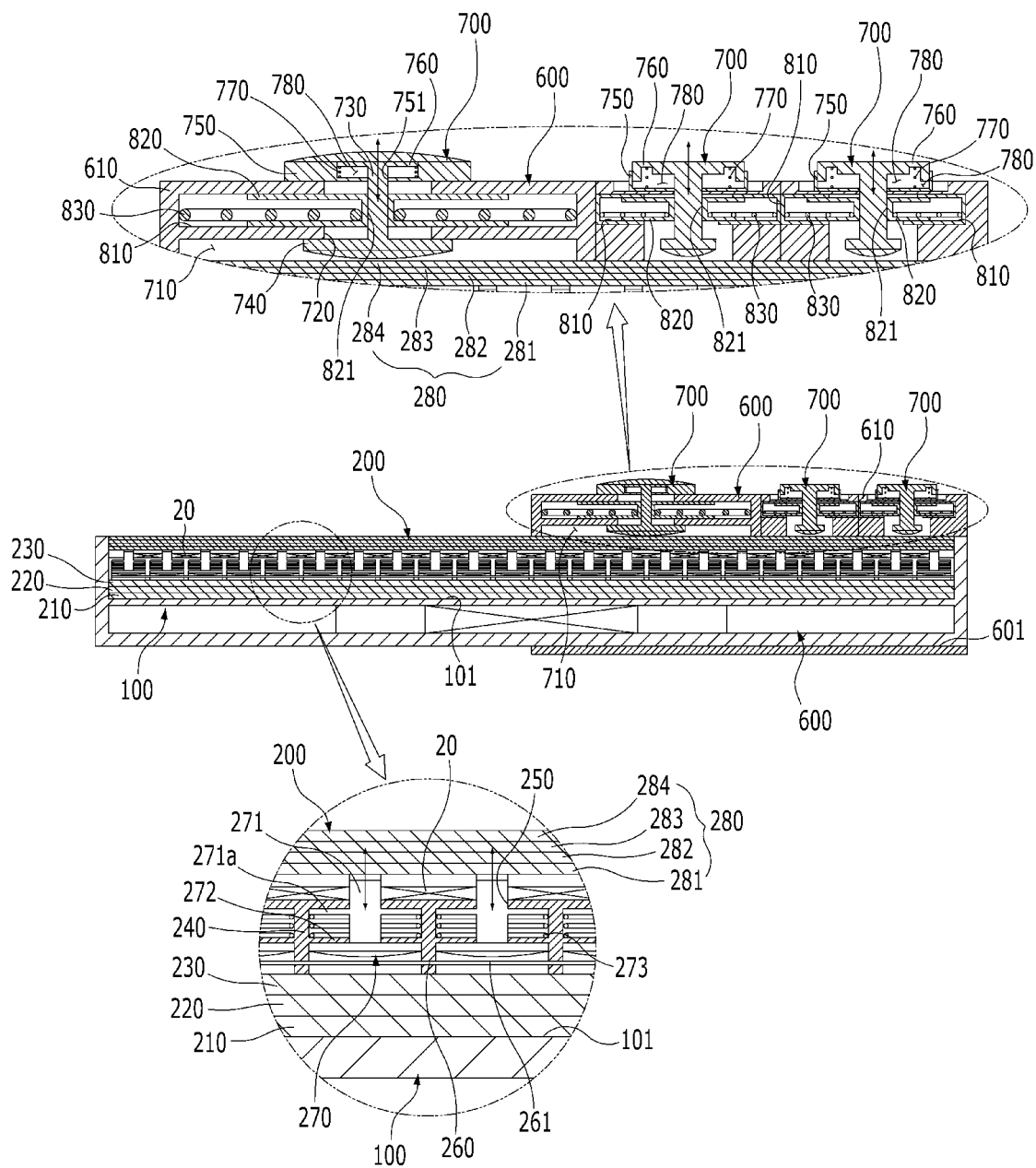
FIG. 12 is a cross-sectional view for showing a state in which a mounting unit and the base of the input apparatus according to the first embodiment of the present disclosure are coupled to each other as viewed from a lateral direction.
Figure 13:
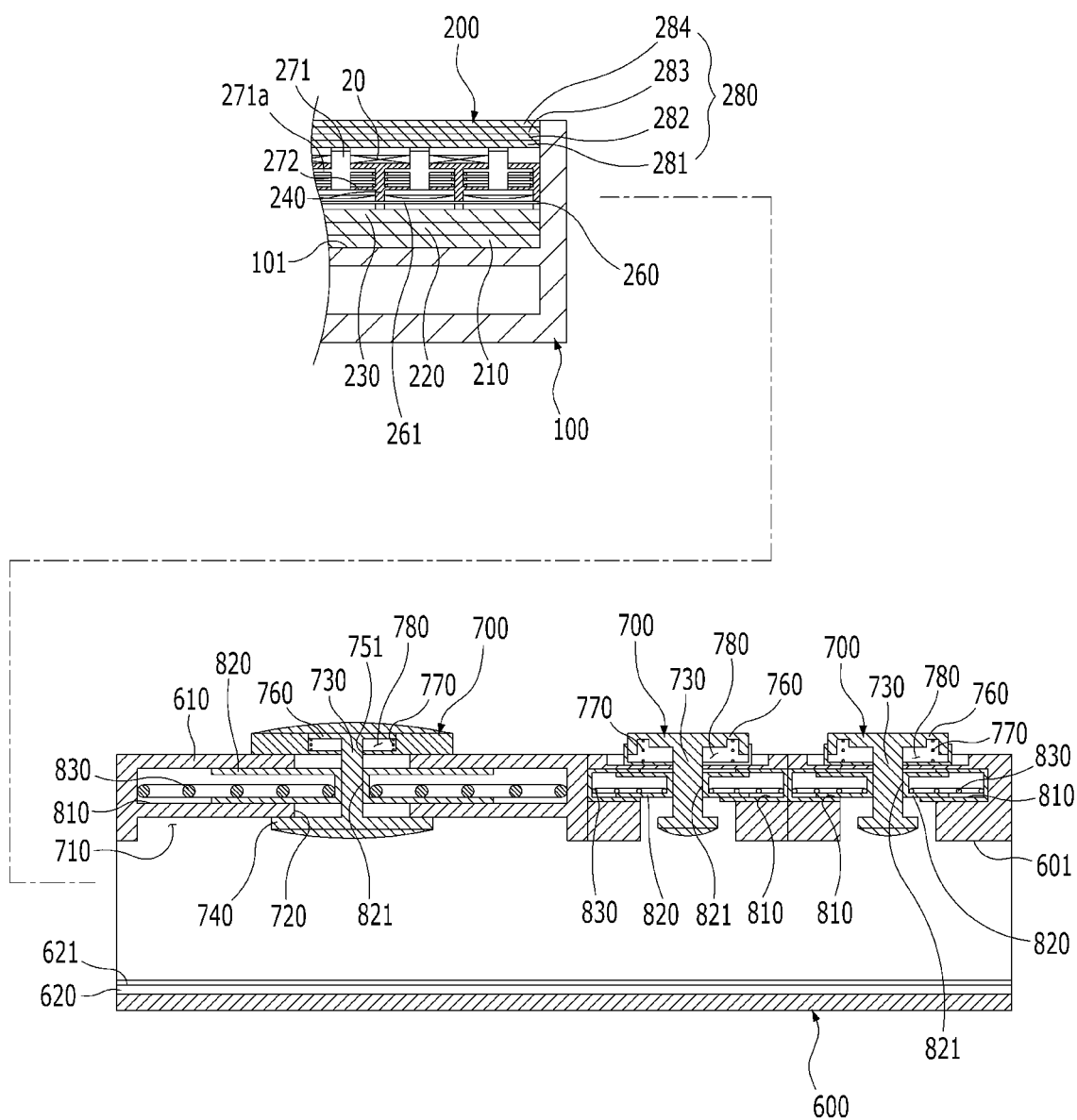
FIG. 13 is a cross-sectional view for showing a state in which the mounting unit and the base of the input apparatus according to the first embodiment of the present disclosure are separated from each other as viewed from the lateral direction.
Figure 14:
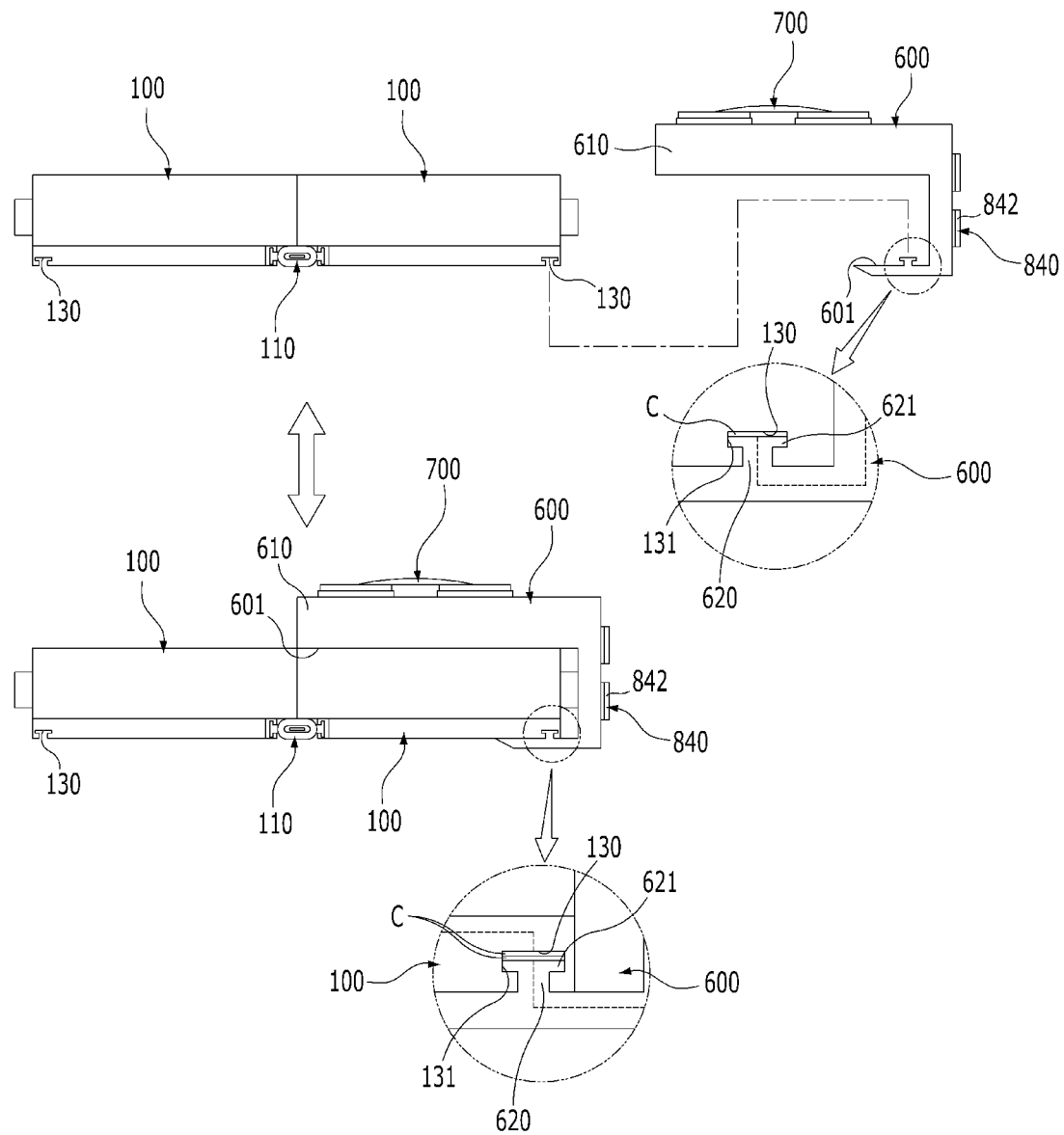
FIG. 14 is a front view for showing states in which the mounting unit and the base of the input apparatus according to the first embodiment of the present disclosure are coupled to and separated from each other.
Figure 15:
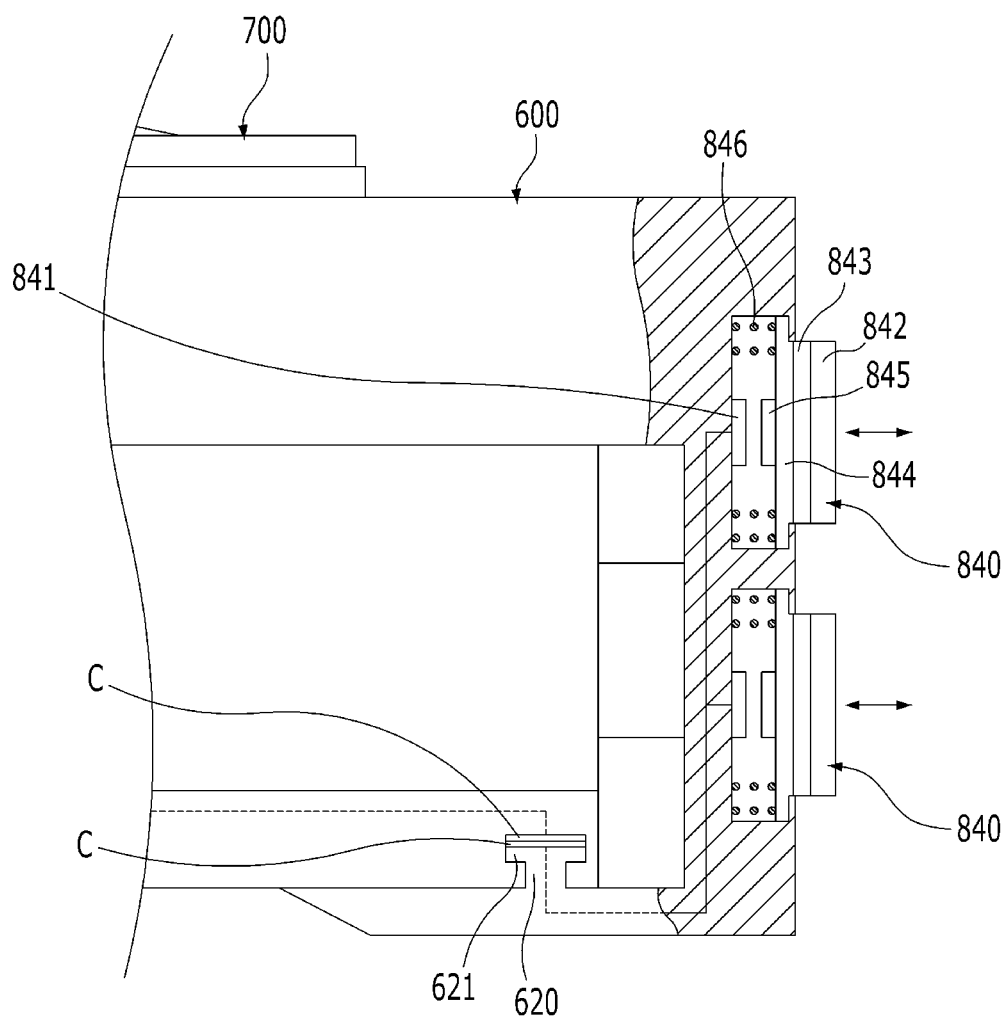
FIG. 15 is a cross-sectional view for showing an auxiliary function selection unit of the input apparatus according to the first embodiment of the present disclosure as viewed from the front direction.
Figure 16:
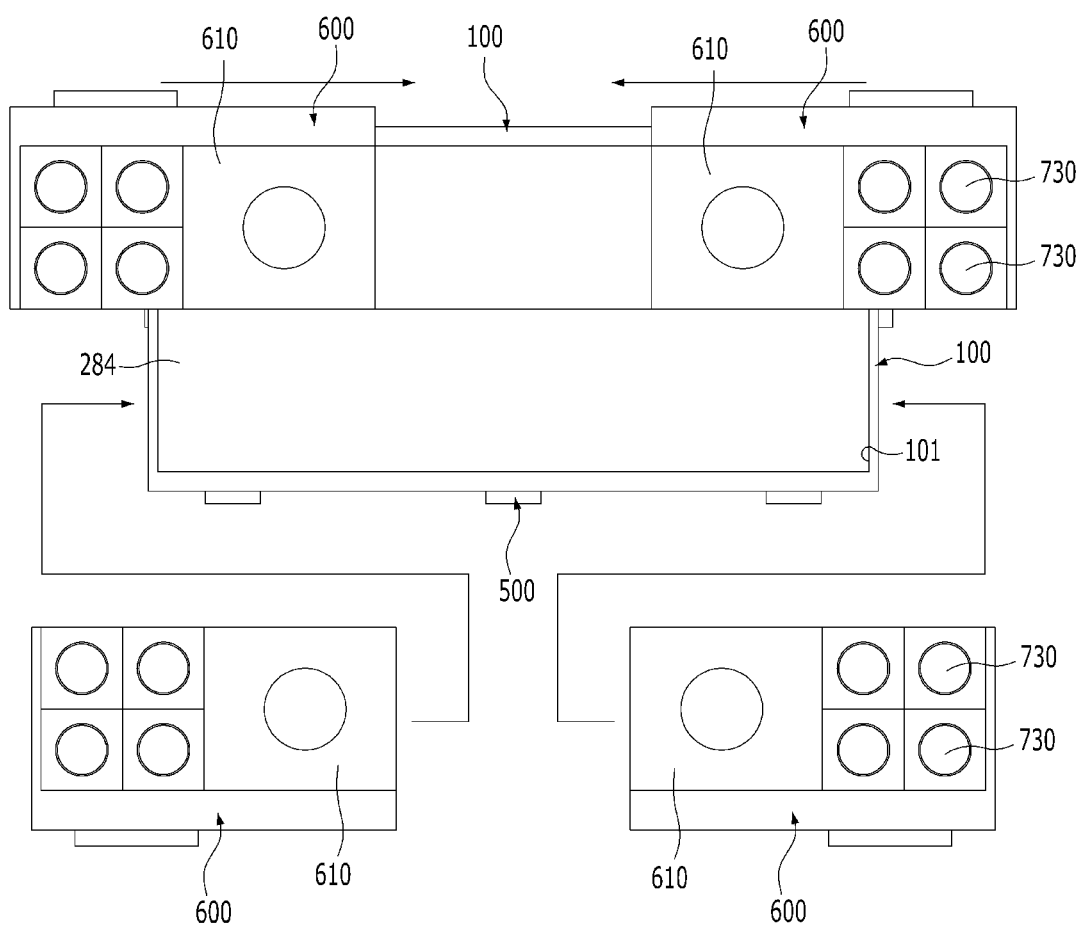
FIG. 16 is a plan view for showing a process of coupling the mounting unit and the bases of the input apparatus according to the first embodiment of the present disclosure.
Figure 17:
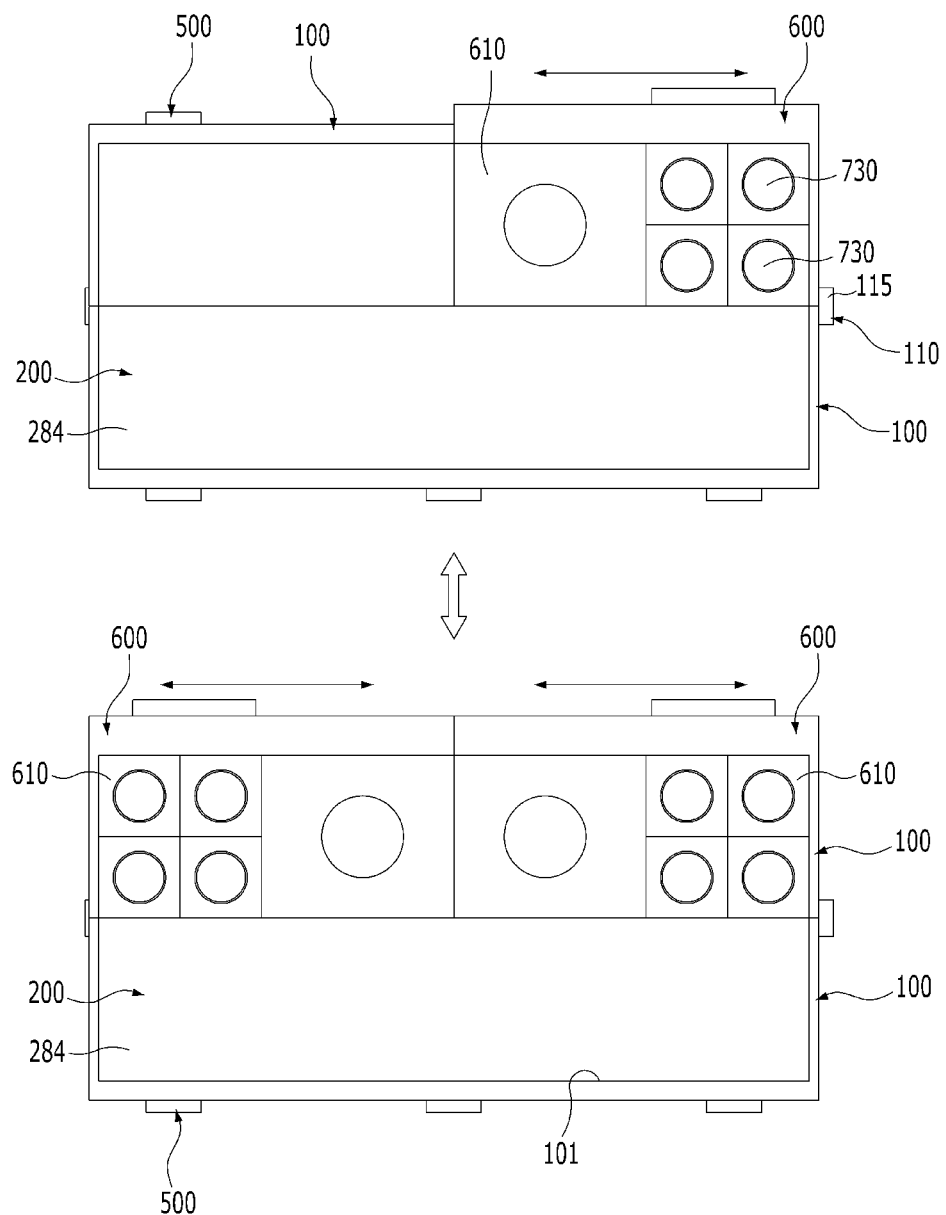
FIG. 17 is a plan view for exemplarily showing states in which the mounting unit of the input apparatus according to the first embodiment of the present disclosure is coupled to one side of the base, and each of both sides of the base.
Figure 18:
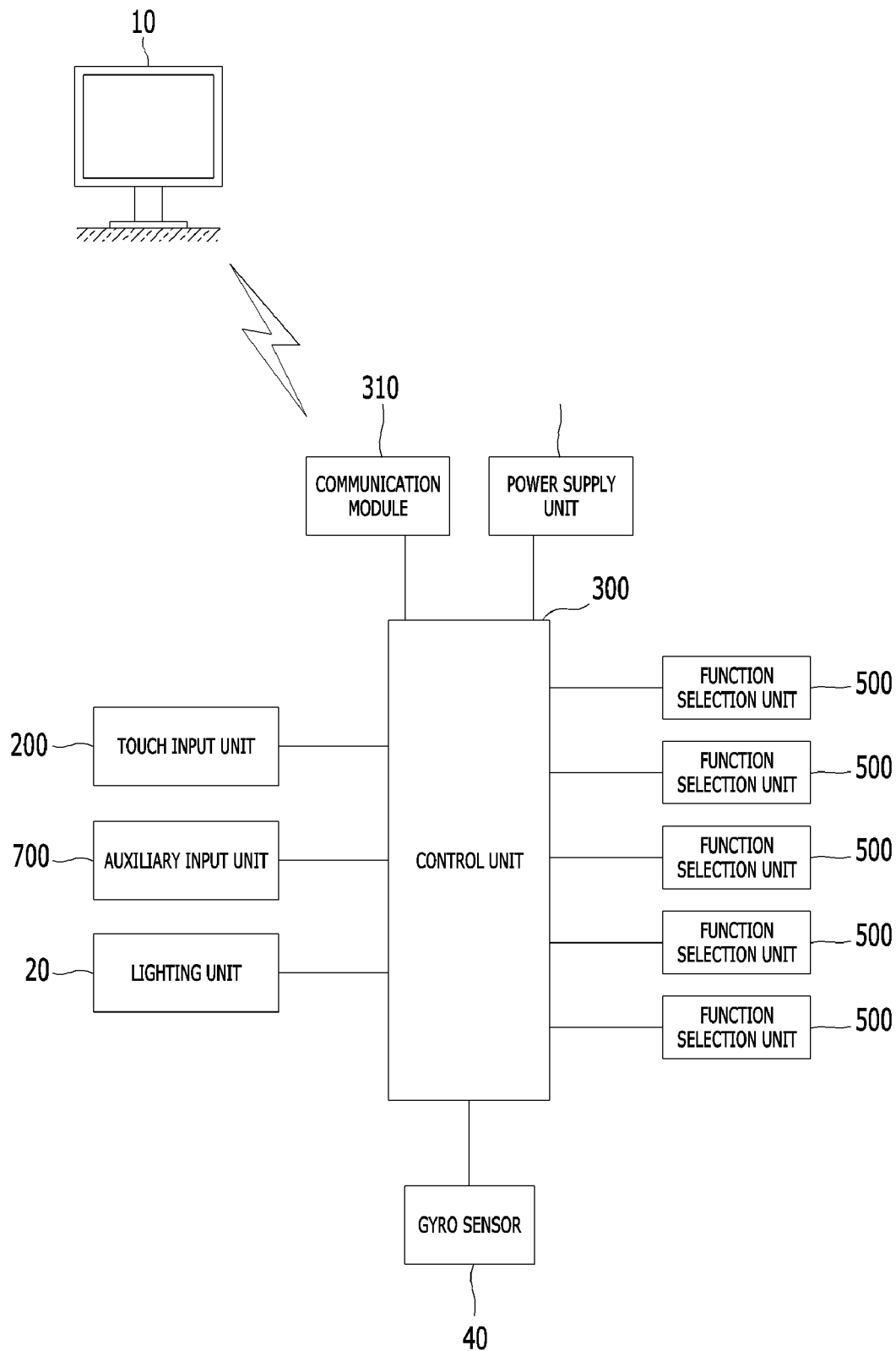
FIG. 18 is a block diagram for schematically showing a connection relationship between components of the input apparatus according to the first embodiment of the present disclosure.

FIG. 10 is a cross-sectional view for showing the hinge part of the input apparatus according to the first embodiment of the present disclosure in a plan view, FIG. 11 is a cross-sectional view for showing a function selection unit of the input apparatus according to the first embodiment of the present disclosure as viewed from a bottom direction, FIG. 12 is a cross-sectional view for showing a state in which a mounting unit and the base of the input apparatus according to the first embodiment of the present disclosure are coupled to each other as viewed from a lateral direction, FIG. 13 is a cross-sectional view for showing a state in which the mounting unit and the base of the input apparatus according to the first embodiment of the present disclosure are separated from each other as viewed from the lateral direction, FIG. 14 is a front view for showing states in which the mounting unit and the base of the input apparatus according to the first embodiment of the present disclosure are coupled to and separated from each other, FIG. 15 is a cross-sectional view for showing an auxiliary function selection unit of the input apparatus according to the first embodiment of the present disclosure as viewed from the front direction, FIG. 16 is a plan view for showing a process of coupling the mounting unit and the bases of the input apparatus according to the first embodiment of the present disclosure, FIG. 17 is a plan view for exemplarily showing states in which the mounting unit of the input apparatus according to the first embodiment of the present disclosure is coupled to one side of the base, and each of both sides of the base, and FIG. 18 is a block diagram for schematically showing a connection relationship between components of the input apparatus according to the first embodiment of the present disclosure.

Figure 19:
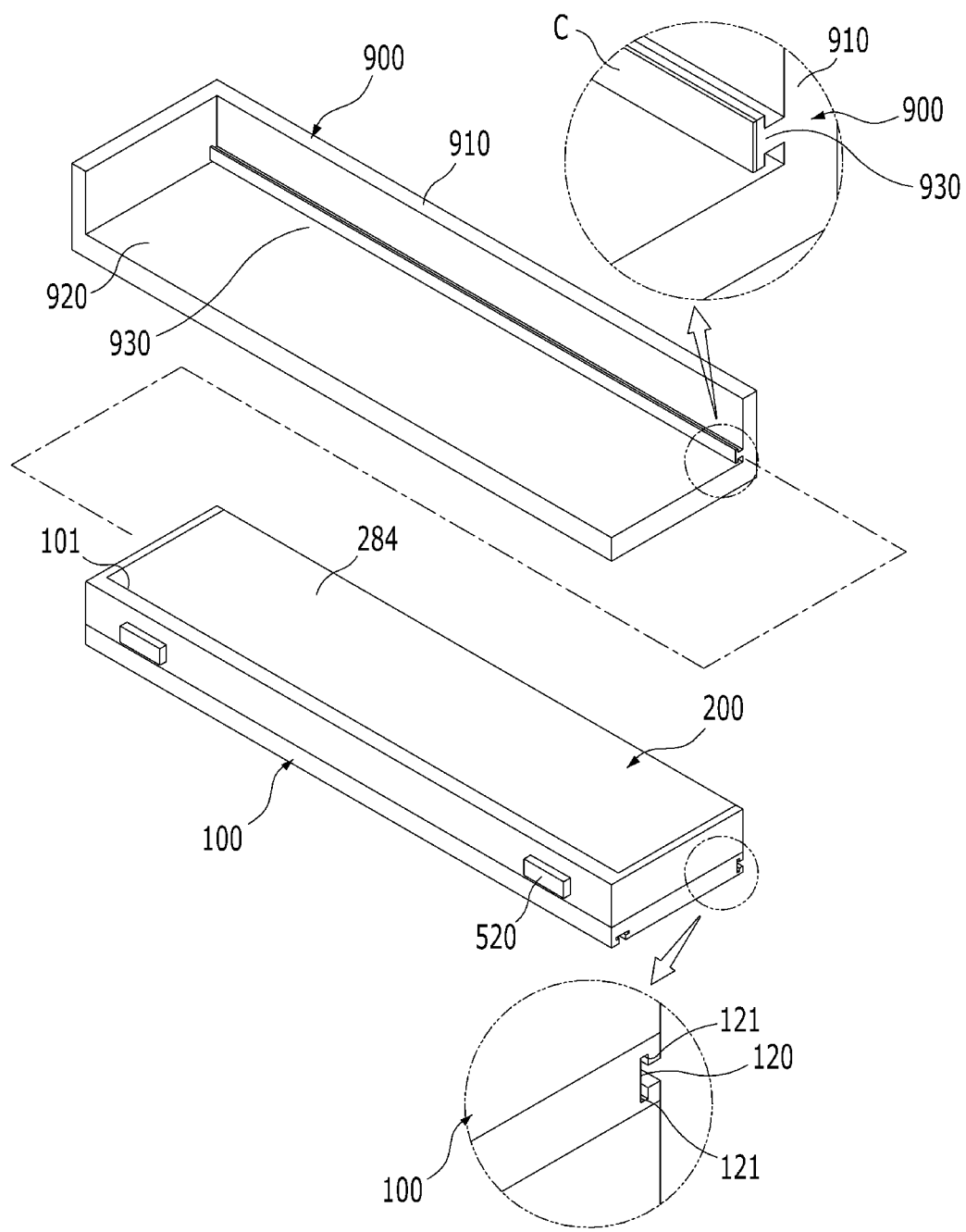
FIG. 19 is a perspective view for showing an auxiliary mounting unit of the input apparatus according to the first embodiment of the present disclosure.
Figure 20:
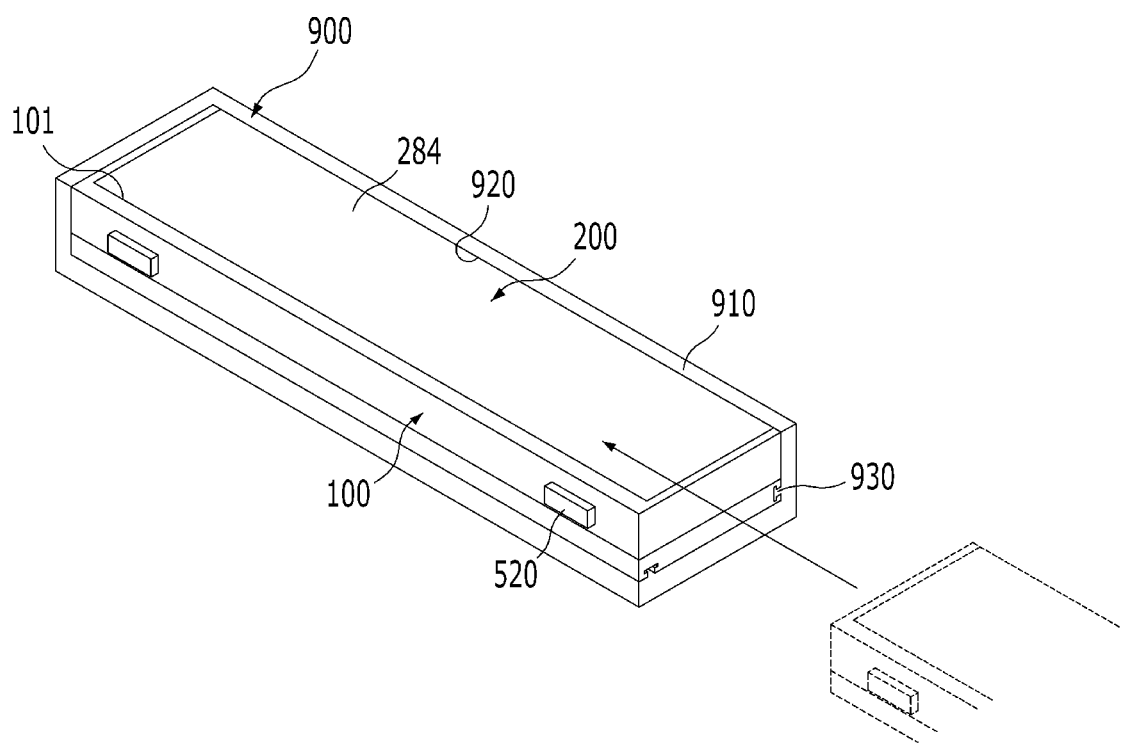
FIG. 20 is a perspective view for showing a process of coupling the auxiliary mounting unit and the base of the input apparatus according to the first embodiment of the present disclosure.
Figure 21:
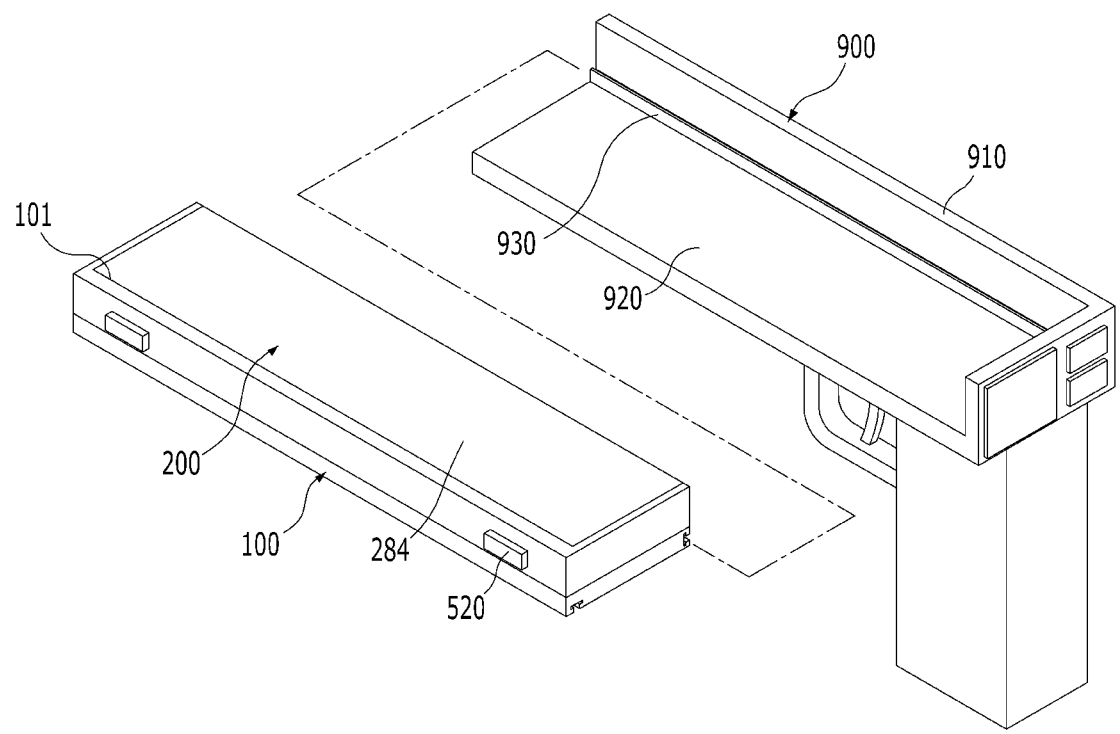
FIG. 21 is a perspective view for showing a state in which an operation switch is applied to the auxiliary mounting unit of the input apparatus according to the first embodiment of the present disclosure.
Figure 22:
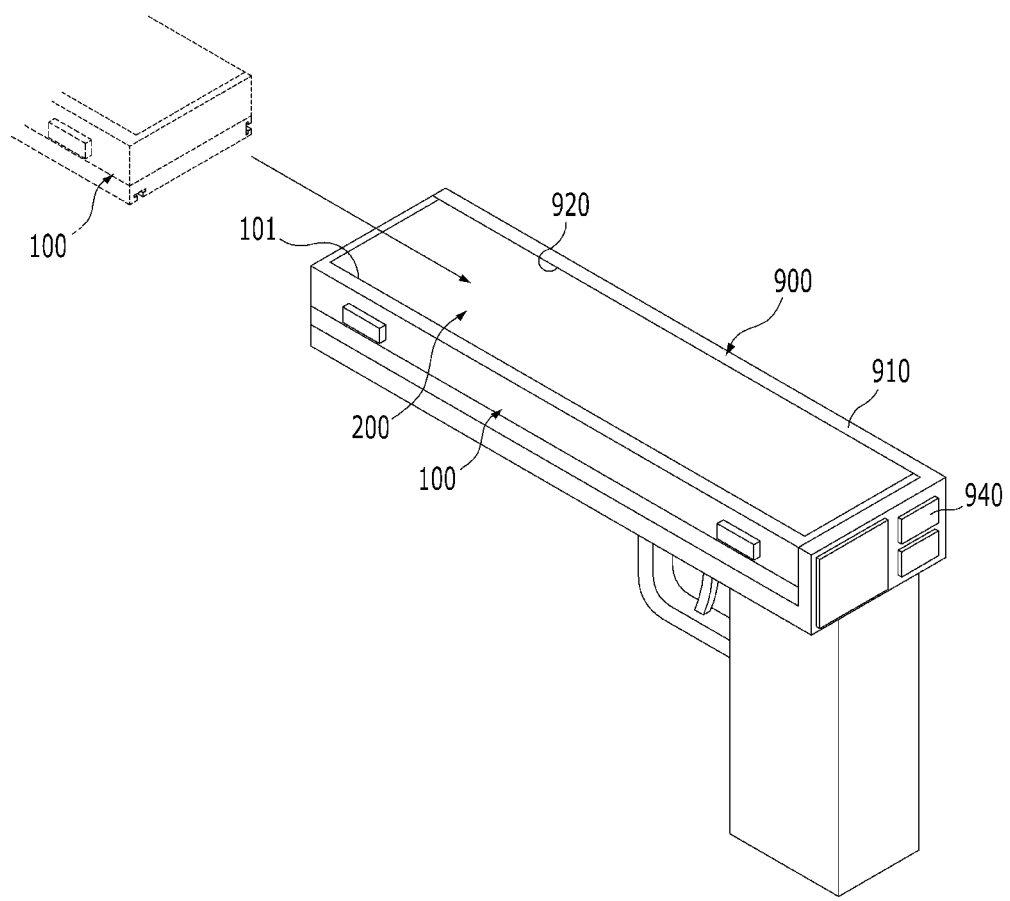
FIG. 22 is a perspective view for showing a state in which a control unit is connected to the operation switch by coupling the base and the auxiliary mounting unit of the input apparatus according to the first embodiment of the present disclosure.
Figure 23:
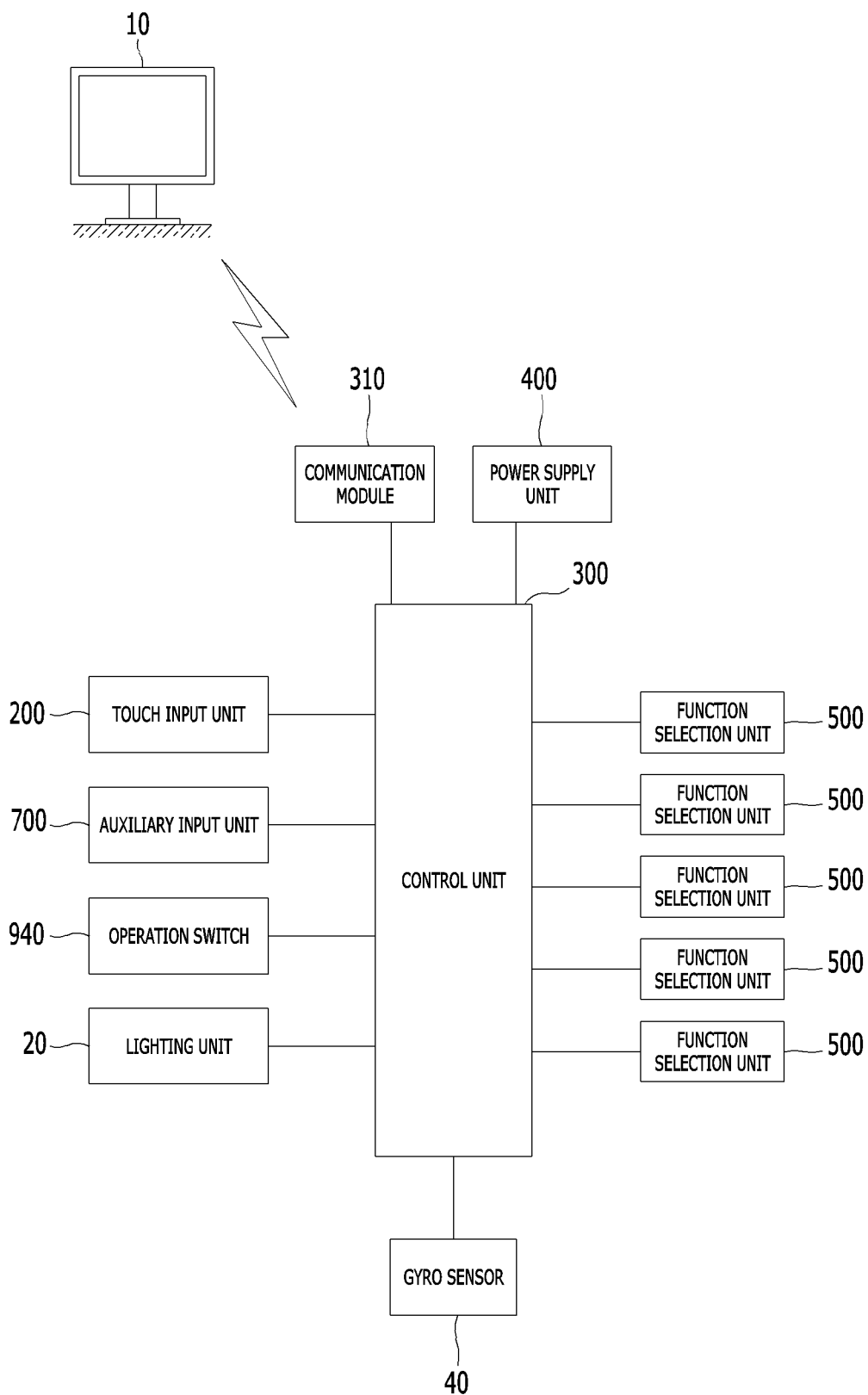
FIG. 23 is a block diagram for schematically showing a state in which the operation switch is applied to the input apparatus according to the first embodiment of the present disclosure.

FIG. 19 is a perspective view for showing an auxiliary mounting unit of the input apparatus according to the first embodiment of the present disclosure, FIG. 20 is a perspective view for showing a process of coupling the auxiliary mounting unit and the base of the input apparatus according to the first embodiment of the present disclosure, FIG. 21 is a perspective view for showing a state in which an operation switch is applied to the auxiliary mounting unit of the input apparatus according to the first embodiment of the present disclosure, FIG. 22 is a perspective view for showing a state in which a control unit is connected to the operation switch by coupling the base and the auxiliary mounting unit of the input apparatus according to the first embodiment of the present disclosure, FIG. 23 is a block diagram for schematically showing a state in which the operation switch is applied to the input apparatus according to the first embodiment of the present disclosure, FIGS. 24 to 31 are views for showing usage examples of the input apparatus according to the first embodiment of the present disclosure, and FIG. 32 is a block diagram for showing a method controlling an input apparatus according to a second embodiment of the present disclosure.

Referring to FIGS. 1 to 31, an input apparatus according to a first embodiment of the present disclosure is connected to an electronic device 10 (a personal computer (PC), a virtual reality (VR) device, an augmented reality (AR) device, or the like) by a near-field communication method and includes a pair of bases 100, a touch input unit 200, a control unit 300, a power supply unit 400, a function selection unit 500, a mounting unit 600, and an auxiliary input unit 700.

The pair of bases 100 have one sides facing each other and rotatably coupled by a hinge part 110, which forms a horizontal rotation center, and an installation groove 101 in which the touch input unit 200 to be described below is installed is formed in an upper surface of each of the bases 100. The installation groove 101 may have a square or rectangular groove shape having four sides formed at an edge thereof, but, the shape of the installation groove 101 may be variously applied as necessary, and an edge part having a predetermined width may be formed between the edge of the installation groove 101 and an edge of the base 100.

In addition, the bases 100 may have a square or rectangular panel shape with four sides formed at the edge thereof, but, the shape of the bases 100 may be variously applied as necessary. When the bases 100 are horizontally unfolded with respect to the hinge part 110, the upper surfaces may form the same plane, and when the bases 100 are folded with respect to the hinge part 110, the area may be reduced as the upper surfaces are in close contact with each other.

In addition, the input apparatus according to one embodiment of the present disclosure may further include a side slide groove 120 that is concavely formed in each of one sides of the bases 100 facing each other, has a length in an axial direction of the hinge part 110, and has one side or both sides in a longitudinal direction open in the axial direction of the hinge part 110, and a pair of horizontal separation prevention grooves 121 concavely formed respectively in both sides of the side slide groove 120 in a width direction. Here, a connection part C connected to the power supply unit 400 through the control unit 300 to be described below and made of a metal material so that electricity is conducted therethrough is provided on a front surface of the side slide groove 120, so that an input area may be activated according to a connection position and a configuration of the auxiliary input unit 700.

The hinge part 110 may further include a first rotating member having a first gear 111 that is provided to be rotatable around the horizontal rotation center and has a length in the axial direction, and a first side slide protrusion 112 that is connected to one side of the first gear 111 in the width direction, has a length in an axial direction of the first gear 111, and is slidably coupled to the side slide groove 120 through one side in the longitudinal direction in a male-female manner, a second rotating member having a second gear 113 that is provided to be rotatable around the horizontal rotation center so as to be rotated by being engaged with the first gear 111 and has a length in the axial direction, and a second side slide protrusion 114 that is connected to one side of the second gear 113 in the width direction, has a length in an axial direction of the second gear 113, and is slidably coupled to the side slide groove 120 through the other side in the longitudinal direction in a male-female manner, a pair of first horizontal separation prevention protrusions 112a protruding from both sides of the first side slide protrusion 112 in the width direction so as to be inserted into the horizontal separation prevention grooves 121, respectively, in a male-female manner, and a pair of second horizontal separation prevention protrusions 114a protruding from both sides of the second side slide protrusion 114 in the width direction so as to be inserted into the horizontal separation prevention grooves 121, respectively, in a male-female manner.

Each of the first gear 111 and the second gear 113 has a length on both sides in the axial directions and is provided to be rotatable around the horizontal rotation center, and in each of the first gear 111 and the second gear 113, a plurality of teeth are arranged along a radius of rotation around the horizontal rotation center. The first gear 111 and the second gear 113 rotate in a direction in which the bases 100 are folded or unfolded in a state in which the teeth in a radial direction are engagedly coupled to correspond to each other, and a connection member 115 may be coupled to each of both sides of the first gear 111 and the second gear 113 in the axial direction.

The connection members 115 may be respectively positioned on both sides of the first gear 111 and the second gear 113 in the axial direction in a state of being in close contact therewith, and a pair of rotation shafts protrude from facing one sides of the connection members 115 and correspondingly inserted into both sides of the first gear 111 and the second gear 113 in the axial direction, respectively, in a male-female manner to form the horizontal rotation center. Since the pair of rotation shafts are respectively coupled to both sides of the first gear 111 and the second gear 113 in the axial direction, the first gear 111 and the second gear 113 may rotate around the rotation shaft of the connection members 115 while the first gear 111 and the second gear 113 are engagedly coupled, and the connection members 115 may cover both sides of the first gear 111 and the second gear 113 in the axial direction, respectively.

The first side slide protrusion 112 is slidably coupled to the side slide groove 120, which is formed on one side of one of the pair of bases 100, in the longitudinal direction in a male-female manner, and when the first side slide protrusion 112 is coupled to the side slide groove 120, since the pair of first horizontal separation prevention protrusions 112a are inserted into the horizontal separation prevention grooves 121 in a male-female manner, the first side slide protrusion 112 is not separated from the side slide groove 120 in the width direction.

The second side slide protrusion 114 is slidably coupled to the side slide groove 120, which is formed on one side of the other one of the pair of bases 100, in the longitudinal direction in a male-female manner, and when the second side slide protrusion 114 is coupled to the side slide groove 120, since the pair of second horizontal separation prevention protrusions 114a are inserted into the horizontal separation prevention grooves 121 in a male-female manner, the second side slide protrusion 114 is not separated from the side slide groove 120 in the width direction.

In this state, facing one sides of the first gear 111 and the second gear 113 may be horizontally engaged and coupled to each other, and the connection members 115 may be positioned on both sides of the first gear 111 and the second gear 113 in the axial direction in a state of being in close contact therewith. When the pair of rotation shaft protruding toward facing one sides of the connection members 115 are inserted into both sides of the first gear 111 and the second gear 113 in the axial direction in a male-female manner, the first gear 111 and the second gear 113 may not be separated in opposite directions and may maintain an engagedly rotatable state.

In addition, a connection part C made of a metal material so that electricity is conducted therethrough may be provided on each of a front surface of the first side slide protrusion 112 and a front surface of the second side slide protrusion 114. For example, when each of the first side slide protrusion 112 and the second side slide protrusion 114 is coupled to the side slide groove 120 in a male-female manner, the connection part C provided on the front surface of each of the first side slide protrusion 112 and the second side slide protrusion 114 may be electrically connected to a connection part C provided on the front surface of the side slide groove 120.

In addition, a charging terminal 116 may be provided at one side of one of the connection members 115 in the axial direction such that a connector of a charging cable 30 is electrically connected thereto as shown in FIG. 10. The charging terminal 116 may be electrically connected to the connection parts C provided on the front surfaces of the first side slide protrusion 112 and the second side slide protrusion 114 by extending through an inside of the rotation shaft protruding from one side of the connection member 115 and the width direction of each of the first side slide protrusion 112 and the second side slide protrusion 114.

That is, when the connector of the charging cable 30 is coupled to the charging terminal 116 of the connection member 115, power supplied through the charging cable 30 may be transmitted to the control unit 300 through the connection parts C of the first side slide protrusion 112 and the second side slide protrusion 114 and the connection part C of the side slide groove 120, and the power supply unit 400 may be charged by using the power transmitted to the control unit 300.

A locking member (not shown), which prevents the first gear 111 and the second gear 113 from rotating when the bases 100 are spread horizontally, may be provided on the hinge part 110, and when the locking member is switched to an unlocked state, the first gear 111 and the second gear 113 may be switched to a rotating state, and the structure of the locking member may be variously applied as necessary.

The touch input unit 200 is provided in the installation groove 101 of the base 100 to form a finger touch area of a user, and detects a finger input signal in a capacitive manner when the finger is in contact therewith. Since the touch input unit 200 is provided in each of the bases 100, finger input signals of the user's left hand and right hand may be individually input.

In addition, the touch input unit 200 may detect the finger input signal in a first finger input mode (touch) (capacitive manner) when the finger comes into contact (touch) therewith with a set pressure or less, detect the finger input signal in a second finger input mode (press) when the finger comes in contact (press) therewith with the set pressure or more, and detect a position of the finger through the finger input signal. That is, by setting coordinates of a function input area, the user may move a pointer shown through a display window of the electronic device in various directions by touching the touch input unit 200 with the finger with the set pressure or less, and when the user presses the touch input unit 200 with the finger with the set pressure or more, various functions may be performed according to a setting of the input area of the electronic device 10 by an input operation of the finger input signal. In addition, by setting the input area function, the function is changed to the form of a keyboard, a mouse, and a console game machine according to the setting of the program, and various input methods may be used by using the contact and separation of the finger in touch and push inputs according to the set function.

The touch input unit 200 according to one embodiment of the present disclosure may include a first insulating plastic 210 provided on a lower surface of the installation groove 101, a first touch sensor 220 stacked and connected to an upper surface of the first insulating plastic 210, a first conductive member 230 stacked and connected to an upper surface of the first touch sensor 220, a second insulating plastic 240 made of a non-conductive material and stacked on an upper surface of the first conductive member 230, a plurality of lifting holes 250 vertically passing through the second insulating plastic 240, a conductive elastic pad 260 positioned within a thickness of the second insulating plastic 240 and having a plurality of elastic deformation areas 261 respectively positioned in the lifting holes 250 to be spaced apart from an upper portion of the first conductive member 230, a first operation unit 270 provided to be liftable in the lifting hole 250 and having a lower end that presses the elastic deformation area 261 downward to connect the elastic deformation area 261 to the upper surface of the first conductive member 230 when the first operation unit 270 descends to a lower connection position, and a conductive touch unit 280 positioned to be spaced apart from an upper portion of the second insulating plastic 240 and stacked and connected to an upper end of the first operation unit 270.

The first conductive member 230 may use an electroconductive plastic and may be horizontally installed in the form of a panel on the lower surface of the installation groove 101. The first touch sensor 220 may detect the movement of the finger in X-line and Y-line directions in an electrostatic manner, may be horizontally installed on the upper surface of the first conductive member 230, and may be electrically connected to the first conductive member 230 so that current may flow therebetween. Here, the first touch sensor 220 may detect the movement of the finger in the X-line and Y-line directions and transmit the detected movement to the control unit 300 to be described below.

The first conductive member 230 may use an electroconductive plastic, and may be horizontally installed in the form of a panel on the upper surface of the first touch sensor 220. The second insulating plastic 240 uses a non-conductive plastic material in which electricity is not conducted, and the second insulating plastic 240 may be horizontally installed in the form of a panel on the upper surface of the first conductive member 230 and may be electrically connected to the first conductive member 230 so that electricity may be conducted therebetween.

The lifting hole 250 is a space in which the first operation unit 270 to be described below is installed, and vertically passes through the second insulating plastic 240. Here, a lifting rod 271 to be described below is positioned to be liftable in the lifting hole 250, and an upper end of the lifting rod 271 to be described below protrudes from an upper portion of the lifting hole 250.

The conductive elastic pad 260 may use a conductive rubber material or the like having electrical conductivity, may be horizontally installed in the form of a panel within a thickness of the insulating plastic 240, and the plurality of elastic deformation areas 261 formed on the conductive elastic pad 260 may be respectively positioned in the lifting holes 250 to be spaced apart from the upper portion of the first conductive member 230.

The elastic deformation areas 261 may be positioned in the lifting holes 250, respectively, and when the lifting rod 271 to be described below descends to the connection position, the elastic deformation area 261 is electrically connected to the upper surface of the first conductive member 230 by being convexly bent and deformed downwardly while being connected to the lifting rod 271. That is, when the user presses a conductive fiber to be described below with the finger with the set pressure or more to lower the lifting rod 271 to the connection position, a lower end of the lifting rod 271 is connected to an upper end of the elastic deformation area 261.

The first operation unit 270 is for detecting the contact (touch) of the finger, and is switched to the second finger input mode (press) in which the finger input signal is input when a pressure transmitted from the user's finger is greater than or equal to the set pressure.

The first operation unit 270 according to one embodiment of the present disclosure may include the lifting rod 271 positioned to be liftable on an upper portion of the elastic deformation area 261, having a side portion from which a locking protrusion 271a protrudes, and configured to press the elastic deformation area 261 downward when descending to the connection position, a locking step 272 protruding from an inner circumferential surface of the lifting hole 250 and through which the lower end of the lifting rod 271 vertically passes, and an elastic member 273 provided between the locking step 272 and the locking protrusion 271a and configured to elastically support a lower end of the locking protrusion 271a upward.

The lifting rod 271 is provided in the lifting hole 250 to be liftable from the lower connection position and to an upper connection release position, the lower end of the lifting rod 271 is positioned to be liftable in the lifting hole 250, and the upper end of the lifting rod 271 is positioned while being in close contact with a lower surface of a first conductive elastic pad 281 to be described below. The lifting rod 271 as described above is lifted to the upper connection release position while being elastically supported by the elastic member 273, the locking protrusion 271a of the lifting rod 271 maintains the positionally locked state to an upper end of the lifting hole 250, and the lower end of the lifting rod 271 is positioned to be spaced apart from the upper portion of the elastic deformation area 261. On the other hand, when the user presses a conductive fiber 284 of the conductive touch unit 280 to be described below with the finger with the set pressure or more, the lifting rod 271 descends to the lower connection position, and the elastic member 273 is compressed downward by the lowering of the locking protrusion 271*a*.

The locking step 272 may protrude from the inner circumferential surface of the lifting hole 250, a through hole may vertically pass through the locking step 272 so that the lower end of the lifting rod 271 vertically passes through the through hole, and the lower end of the lifting rod 271 may be positionally locked when the lifting rod 271 is lifted to the connection release position.

The elastic member 273 is coupled to an outside of the lifting rod 271, has a lower end seated on an upper end of the locking step 272, and has an upper end elastically supporting the lower end of the locking protrusion 271*a* upward. For example, when the lifting rod 271 descends to the connection position, the elastic member 273 is compressed downward, and when the lifting rod 271 is lifted to the connection release position, the elastic member 273 is stretched upward by its own elastic force, and the lifting rod 271 may be positioned in a lifted state by the elastic supporting force of the elastic member 273. Here, the elastic member 273 may have a coil spring shape surrounding the outside of the lifting rod 271.

The conductive touch unit 280 may include the first conductive elastic pad 281 positioned to be spaced apart from the upper portion of the second insulating plastic 240 and having a lower surface stacked and connected to the upper end of the lifting rod 271, a second touch sensor 282 stacked and connected to an upper surface of the first conductive elastic pad, a second conductive touch pad 283 stacked and connected to an upper surface of the second touch sensor 282, and the conductive fiber 284 stacked and connected to an upper surface of the second conductive touch pad 283 to form the finger touch area.

The first conductive elastic pad 281 may be manufactured using an elastic material so that a shape thereof can be horizontally restored by self-elastic force after being convexly bent and deformed downwardly when the user presses the first conductive elastic pad 281, and the first conductive elastic pad 281 may be manufactured using a material such as polyethyleneterephthalate (PET). Here, the lower surface of the first conductive touch pad 281 and the upper end of the lifting rod 271 may be attached to and detached from each other by a separate adhesive (reference numeral not shown).

The second touch sensor 282 may detect the movement of the finger in the X-line and Y-line directions in an electrostatic manner, may be horizontally installed on the upper surface of the first conductive elastic pad 281, and may be electrically connected to the first conductive elastic pad 281 so that electricity may be conducted therebetween. The second touch sensor 282 as described above may detect the movement of the finger in the X-line and Y-line directions and transmit the detected movement to the control unit 300 to be described below.

The second conductive touch pad 283 may be manufactured using an elastic material so that a shape thereof can be horizontally restored by self-elastic force after being convexly bent and deformed downwardly when the user presses the second conductive touch pad 283, and the first conductive elastic pad 281 may be manufactured using a conductive material such as PET.

The conductive fiber 284 is the part with which the user's finger comes into contact (touch), and the conductive fiber 284 may use a conductive yarn material in which a conductive material such as carbon or metal is included in a fiber in order to detect static electricity flowing through the finger of the user, and is horizontally coupled to an upper surface of the second conductive touch pad 283. Here, the conductive fiber 284 may horizontally cover the entire area above the installation groove 101.

Here, the conductive fiber 284 may adjust the sensitivity of the second finger input mode (press) according to a thickness and an elastic force of the conductive fiber 284 by absorbing static electricity of the finger that touches finely as an input of the touch input unit 200 using a user's fingernail and using a soft touch for a long time, and may be provided in the form suitable for a user's touch pressure and the purpose.

The control unit 300 is provided inside the base 100, is connected to the electronic device by a communication module 310 by a wireless communication method, and transmits the finger input signal transmitted from the touch input unit 200 to the electronic device 10. Various input modes may be preset in the control unit 300 using the input methods of touching, pressing, and sliding, as well as contacting (touching), non-contacting, separating (raising), and the like.

For example, when the user touches the touch input unit 200 in a preset pattern by using the finger, the corresponding input mode may be executed through the display window of the electronic device 10. The input mode may utilize performing a function immediately upon touch during non-contact, performing a function immediately upon press during non-contact, performing a function after raising the press during non-contact, performing a function immediately upon press during touch, performing a function after raising the press during touch, and the following input methods may be used, for example, double touch, touch swipe, multi-touch, multi-touch rotation, multi-direction touch swipe, one-direction touch swipe, double press, press swipe, multi-press, multi-direction press swipe, one-direction press swipe, and the like.

The communication module 310 may use methods of Bluetooth, Wi-Fi, and the like, but may selectively use various near-field communication methods as necessary, and may be installed in a state of being embedded in the base 100.

In addition, a fingerprint detection unit (not shown) for inputting the fingerprint 21 of the user may be further electrically connected to the control unit 300, and the detection unit of the fingerprint detection unit (not shown) may be installed in a state of being exposed to the outer surface of the base 100. For example, the detection unit of the fingerprint detection unit may be horizontally positioned on the edge-side upper surface of the base 100, and the user may register the fingerprint or release a lock by bringing the finger into contact with the detection unit.

In addition, when the driving of the power supply unit 400 is turned on by using the function selection unit 500 to be described below, a fingerprint recognition function of the fingerprint detection unit may be performed, and the control unit 300 may perform a function of registering and modifying the fingerprint and selectively store one or more fingerprints. In addition, when the user's fingerprint is input through a fingerprint detection unit, the fingerprint detection unit may be unlocked and switched to a usable state.

The power supply unit 400 is provided to be rechargeable or replaceable in each of the bases 100 to supply power to the control unit 300, a power supply state may be turned on/off by the operation of the function selection unit 500 to be described below, a charging terminal (not shown) may be electrically connected to the control unit 300 so that the power supply unit 400 may be charged, and the charging terminal may be exposed to the outside of the base 100. That is, the connector of the charging cable 30 may be connected to the charging terminal to charge the power supply unit 400.

One or more function selection units 500 may be provided on a side surface of the base 100 to be electrically connected to the control unit 300, and may transmit a selection signal to the control unit 300 when one or more pressing operations are performed, and a preset input mode may be selectively performed in the control unit 300 as the selection signal of the function selection unit 500 is input.

As shown in FIG. 10, the function selection unit 500 according to one embodiment of the present disclosure may include an operating groove concavely formed in the side of the base 100, a first connection terminal 510 provided on a front surface of the operating groove and electrically connected to the control unit 300, a third conductive member 520 of which a rear end is inserted to be slidably movable into the operating groove and the other end, which is opposite the rear end, protrudes from a side portion of the base 100, a third touch sensor 530 coupled to the rear end of the third conductive member 520, a third insulating plastic 540 coupled to a rear end of the third touch sensor 530, a second connection terminal 550 coupled to a rear end of the third insulating plastic 540 and connected to the first connection terminal 510 when moved to a connection position, and an elastic member 560 provided between the operating groove and the third insulating plastic 540 and elastically supporting the rear end of the third insulating plastic 540 to a connection release position.

The third conductive member 520 may use an electroconductive plastic, and the elastic member 560 may have a coil spring shape of which both ends elastically support the operating groove and the rear end of the third insulating plastic 540, respectively. For example, when the user presses the third conductive member 520, the third conductive member 520 is moved backward while the elastic member 560 is compressed backward, and the first connection terminal 510 and the second connection terminal 550 may be connected.

The mounting unit 600 has a gripping groove 601 formed on a front surface to allow the base 100 to be correspondingly inserted, and when the base 100 is inserted into the gripping groove 601, an upper body 610 formed on an upper portion of the gripping groove 601 is positioned on an upper surface of the base 100. At this time, the upper body 610 may be positioned in a seated state on an upper end of an edge side of the base 100 so that a lower end of an edge side of the upper body 610 does not come into contact with the touch input unit 200. In addition, as shown in FIGS. 12 and 13, the input apparatus according to one embodiment of the present disclosure may further include a lower slide groove 130 concavely formed in a lower surface of each of the bases 100, having a length in the axial direction of the hinge part 110, and having one side or both sides in the longitudinal direction open in the axial direction of the hinge part 110, a lower slide protrusion 620 protruding upward from a lower surface of the gripping groove 601 so as to be inserted into the lower slide groove 130 correspondingly and slidably coupled to the lower slide groove 130 through one side in the longitudinal direction in a male-female manner, a pair of vertical separation prevention grooves 131 concavely formed respectively in both sides of the lower slide groove 130 in the width direction, and a pair of vertical separation prevention protrusions 621 protruding respectively from both sides of the lower slide protrusion 620 in the width direction so as to be inserted into the vertical separation prevention grooves 131 in a male-female manner.

Here, a connection part C electrically connected to the power supply unit 400 through the control unit 300 and made of a metal material so that electricity is conducted therethrough may be provided on an upper surface of the lower slide groove 130. In addition, a connection part C made of a metal material so that electricity is conducted therethrough may be provided on an upper surface of the lower slide protrusion 620. For example, when the lower slide protrusion 620 is coupled to the lower slide groove 130 in a male-female manner, the connection part C provided on the upper surface of the lower slide protrusion 620 may be electrically connected to the connection part C provided on the upper surface of the lower slide groove 130.

The auxiliary input unit 700 is provided on an upper portion of the upper body 610 to form a seating area of a human body (the finger and the like), and transmits an indirect input signal to the touch input unit 200 by an electrostatic method when the human body is seated thereon. As shown in FIGS. 11 to 15, the auxiliary input unit 700 may include a lifting space 710 concavely formed below the upper body 610, an auxiliary lifting hole 720 vertically passing through the upper body 610 and having a lower portion connected to the lifting space 710, an auxiliary lifting rod 730 provided in the auxiliary lifting hole 720 to be liftable, horizontally movable, and horizontally rotatable and having a lower end connected to the conductive touch unit 280 described above when descending to the connection position, a lower auxiliary locking protrusion 740 that laterally protrudes from a lower end of the auxiliary lifting rod 730 to be positioned in the lifting space 710, and is positionally locked on an upper surface of the lifting space 710 when the auxiliary lifting rod 730 is lifted to a connection release position, a support panel 750 seated on an upper surface of the upper body 610 to be horizontally movable and having an upper fastening hole 751 vertically passing therethrough so that the auxiliary lifting rod 730 vertically passes through the upper fastening hole 751, an upper auxiliary locking protrusion 760 laterally protruding from an upper end of the auxiliary lifting rod 730 to be positioned to be spaced apart from an upper portion of the support panel 750, and a first auxiliary elastic member 770 provided between the support panel 750 and the upper auxiliary locking protrusion 760 and configured to elastically support the lower end of the upper auxiliary locking protrusion 760 upward so that the auxiliary lifting rod 730 is lifted and returned to the connection release position.

In addition, an accommodation groove 780 concavely formed in an upper surface of the support panel 750 and having an upper fastening hole 751 positioned in an inner area thereof may be further included. In this case, the first auxiliary elastic member 770 may be positioned inside the accommodation groove 780, and may elastically support a lower surface of the accommodation groove 780 and a lower end of the upper auxiliary locking protrusion 760 in a vertical direction. The upper auxiliary locking protrusion 760 may further include a conductive rubber 790 that is liftable in the inner area of the accommodation groove 780, coupled to the upper surface of the support panel 750 to cover an upper portion of the accommodation groove 780, and provided to allow a pressing operation to be performed thereon. Here, the first auxiliary elastic member 770 may have a coil spring shape surrounding an outside of the auxiliary lifting rod 730.

In addition, the auxiliary input unit 700 operates in a contact type and a non-contact type with respect to the conductive fiber 284, wherein, in the contact type, a capacitive signal is detected as soon as the user's finger is touched and the first finger input mode (touch) is performed, and even when the user's finger is input in the second finger input mode (press) with the set pressure or more, a sliding input integrated with the first finger input mode is detected, and in the non-contact type, when a button is pressed on the auxiliary input unit 700, an input mode integrated with the first finger input mode (touch) in which the function is performed even when the user's finger is input with the set pressure or less in the second finger input mode.

As shown in FIGS. 12 and 13, the input apparatus according to one embodiment of the present disclosure may include a guide groove 810 concavely formed along an inner circumferential surface of the auxiliary lifting hole 720, a sliding panel 820 having a disk shape, provided in the guide groove 810 to be horizontally movable, and having a lower fastening hole 821 vertically passing therethrough so that the auxiliary lifting rod 730 vertically passes through the lower fastening hole 821, and a second auxiliary elastic member 830 made of a spiral elastic material, provided in the guide groove 810, spirally wound around the auxiliary lifting rod 730, and configured to elastically support an outer circumferential surface of the sliding panel 820 in a direction of the auxiliary lifting rod 730.

One or more auxiliary lifting holes 720 may be formed in the upper body 610, and the number, interval, and the like of the auxiliary lifting holes 720 may be variously applied as necessary. The guide groove 810 is a space in which the sliding panel 820 horizontally moves, an edge of the sliding panel 820 may be horizontally inserted into the guide groove 810, and the sliding panel 820 may be freely moved in a 360-degree direction while being inserted into the guide groove 810.

For example, when the auxiliary lifting rod 730 is pressed to the lower connection position, the first auxiliary elastic member 770 is compressed downward and the lower end of the auxiliary lifting rod 730 is connected to an upper surface of the conductive fiber 284, and when the auxiliary lifting rod 730 is released from pressing, the auxiliary lifting rod 730 may be lifted and returned to the connection release position by a compressive elastic force of the first auxiliary elastic member 770.

In addition, when the auxiliary lifting rod 730 is pushed to the lower connection position and then horizontally moved, the sliding panel 820 may be freely moved in the 360-degree direction in a state in which the sliding panel 820 is inserted into the guide groove 810, and the support panel 750 may be horizontally moved together with the auxiliary lifting rod 730 while being seated on the upper surface of the upper body 610. In this case, the second auxiliary elastic member 830 formed of a spiral elastic material may allow the auxiliary lifting rod 730 to move horizontally by being compressed in a moving direction of the auxiliary lifting rod 730, and when the human body (the finger or the like) is separated from the upper end of the auxiliary lifting rod 730, the auxiliary lifting rod 730 and the sliding panel 820 may be elastically returned to their original positions by a self-elastic force of the second auxiliary elastic member 830.

That is, the indirect input signal may be transmitted to the touch input unit 200 by using the auxiliary input unit 700 in a state in which the mounting unit 600 is coupled to the base 100, and various indirect input signals may be transmitted to the touch input unit 200 by using the auxiliary input unit 700 applied in various forms, thereby enabling various optional functions (console game machine, steering wheel, gaming gun, or the like) to be performed.

In addition, as shown in FIGS. 14 and 15, the input apparatus according to one embodiment of the present disclosure may include one or more auxiliary function selection units 840 provided on a rear surface of the mounting unit 600. The auxiliary function selection unit 840 may be electrically connected to the control unit 300 when the mounting unit 600 is coupled to the base 100, may transmit a selection signal to the control unit 300 during a pressing operation, and may perform an input mode preset in the control unit 300 by the input of the selection signal from the auxiliary function selection unit 840.

The auxiliary function selection unit 840 according to one embodiment of the present disclosure may include the operating groove concavely formed in the rear surface of the mounting unit 600, a first selection unit-side connection terminal 841 provided on the front surface of the operating groove and electrically connected to the control unit 300, a first selection unit-side conductive member 842 of which a rear end is inserted to be slidably movable into the operating groove and the other end, which is opposite the rear end, backwardly protrudes from the mounting unit 600, a selection unit-side touch sensor 843 coupled to a rear end of the first selection unit-side conductive member 842, a second selection unit-side conductive member 844 coupled to a rear end of the selection unit-side touch sensor 843, a second selection unit-side connection terminal 845 coupled to a rear end of the second selection unit-side conductive member 844 and connected to the first selection unit-side connection terminal 841 when moved to a connection position, and a selection unit-side elastic member 846 provided between the operating groove and the second selection unit-side conductive member 844 and configured to elastically support the rear end of the second selection unit-side conductive member 844 to a connection release position.

The first selection unit-side conductive member 842 and the second selection unit-side conductive member 844 may use an electro-conductive plastic, and the selection unit-side elastic member 846 may have a coil spring shape of which both ends elastically support the operating groove and the rear end of the second selection unit-side conductive member 844, respectively. For example, when the user presses the first selection unit-side conductive member 842, the first selection unit-side conductive member 842 is moved backward while the selection unit-side elastic member 846 is compressed backward, and the first selection unit-side connection terminal 841 and the second selection unit-side connection terminal 845 may be connected.

In addition, as shown in FIGS. 19 to 22, the input apparatus according to one embodiment of the present disclosure may further include an auxiliary mounting unit 900 on which one of the bases 100 is mounted. The auxiliary mounting unit 900 may include a mounting hole 910 having a length at both sides thereof, a mounting groove 920 concavely formed in an upper surface of the mounting hole 910 so that the base 100 is correspondingly inserted thereto, and having a front surface and one (left or right) side surface open, an auxiliary mounting protrusion 930 that protrudes upward from a lower surface of the mounting groove 920, has a length in a front-back direction, and is slidably coupled to the side slide groove 120 through one side in the longitudinal direction in a male-female manner, and an operation switch 940 operably provided on a rear surface of the mounting hole 910, and electrically connected to the control unit 300 when the base 100 is coupled to the mounting groove 920.

For example, the auxiliary mounting unit 900 may be applied in the form of a firearm (pistol or the like). In this case, a handle that the user can grip by hand may be provided at a lower portion of the auxiliary mounting unit 900, an operation switch 940 of a trigger type may be installed in the front of the handle so as to enable firing, and one or more operation switches 940 may be provided to be operable even on a rear surface of the auxiliary mounting unit 900 so that the user can operate with the finger (a thumb or the like).

The operation switches 940 may selectively apply an operation structure such as a pressing operation, a rotation, a sliding movement, or the like. In other words, the indirect input signal may be transmitted to the touch input unit 200 by using the operation switch 940 in a state in which the base 100 is coupled to the mounting groove 920 of the auxiliary mounting unit 900, various indirect input signals may be transmitted to the touch input unit 200 by using the operation switch 940 applied in various forms, and the input apparatus may be used by being mounted on a gaming gun, steering wheel, or the like as shown in FIG. 22 by mounting various options through the selective operation of the operation switch 940 and using a motion sensing function of a gyro sensor 40.

In addition, a connection part C electrically connected to the operation switch 940 and made of a metal material may be provided on a front surface of the auxiliary mounting protrusion 930. For example, when the mounting groove 920 of the auxiliary mounting unit 900 is coupled to the base 100, the connection part C provided on the front surface of the auxiliary mounting protrusion 930 and the connection part C provided on the front surface of the side slide groove 120 may be electrically connected, and the indirect input signal may be transmitted to the touch input unit 200 by using the operation switch 940.

Meanwhile, the input apparatus according to one embodiment of the present disclosure may further include a lighting unit 20 electrically connected to the control unit 300. A plurality of lighting units 20 may be arranged along an upper surface of the second insulating plastic 240, may be turned on when the user touches the conductive fiber 284 to emit light upward, and may display various input options to the outside according to the connected electronic device 10.

Here, the lighting units 20 may each use a lamp such as a light-emitting diode (LED) or the like and may be arranged to be spaced apart from each other along the upper surface of the second insulating plastic 240, and the conductive touch unit 280 may be manufactured using a material through which light can be transmitted so that the light of the lighting unit 20 can be diffused upward. In addition, the lighting unit 20 may be disposed at an interval between the lifting rods 271 described above, the installation position and size of the lighting unit 20 may be variously applied as necessary, and an input area and an input window may be displayed externally.

Figure 28:
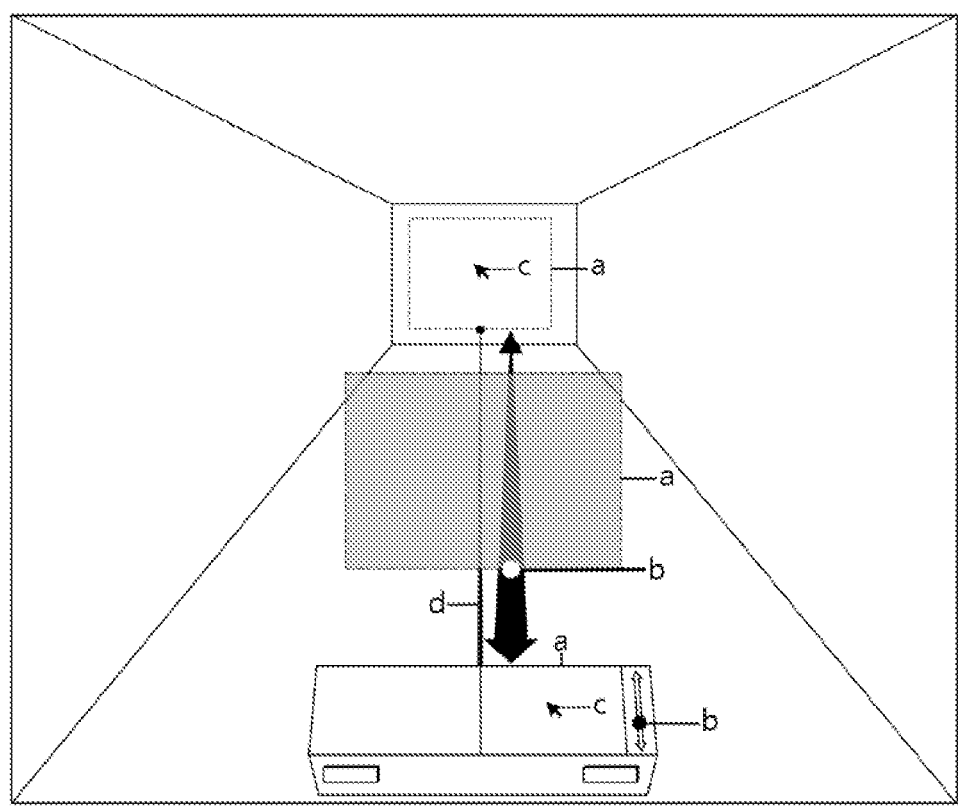
Figure 29:
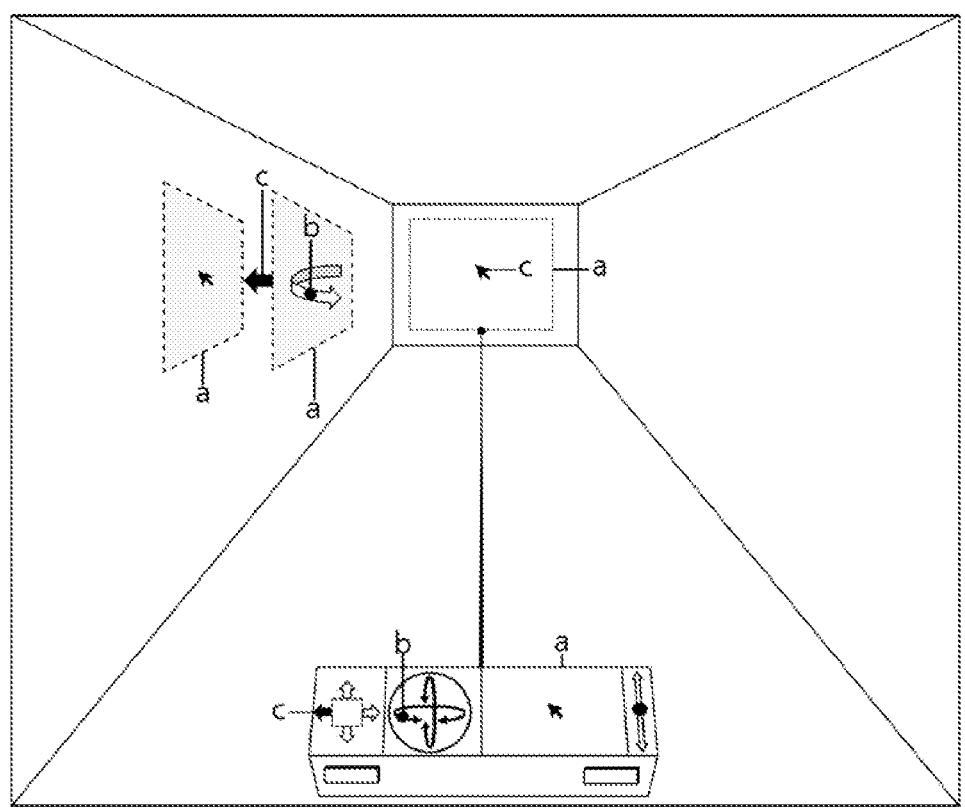

In addition, as shown in FIG. 23, the input apparatus according to one embodiment of the present disclosure may further include the gyro sensor 40. The gyro sensor 40 may be installed inside the base 100 and electrically connected to the control unit 300. That is, by detecting the x-, y-, and z-axis coordinates of the input apparatus using the gyro sensor 40, even when a field of view is blocked in a virtual reality space, a position of the device, and the finger input area of the touch input unit 200 may be confirmed, and the user's motion may be detected, and thus, as shown in FIGS. 28 and 29, it is possible to adjust the mouse input range or utilize in various electronic devices 10 (e.g., console gaming devices and VR devices).

Hereinafter, the operation of the touch input unit 200 according to the present disclosure will be described as follows. First, when the user touches the conductive fiber 284 with the finger with the set pressure or less, the first finger input mode (touch) is performed. In this case, static electricity transmitted to the conductive fiber 284 through the user's finger is transmitted to the second touch sensor 282, and the second touch sensor 282 detects a position at which the user's finger is touched and transmits the finger input signal to the control unit 300.

On the other hand, when a pressure with which the user presses the conductive fiber 284 with the finger is greater than or equal to the set pressure, the second finger input mode (press) is performed, a seating area of the conductive fiber 284 is convexly bent and deformed downwardly, and the lifting rod 271 positioned in the corresponding seating area descends to the lower connection position.

At this time, at the same time that the lower end of the lifting rod 271 is connected to the upper end of the elastic deformation area 261, the elastic member 273 is compressed downward, and a lower end of the elastic deformation area 261 is connected to the upper surface of the first conductive member 230. That is, a connection signal of the elastic deformation area 261 is transmitted to the first touch sensor 220, and the first touch sensor 220 senses a position where the user's finger touches and transmits the finger input signal to the control unit 300.

The method in which the user inputs the finger input signal with the finger may be applied in various ways, an input mode may be performed when the user touches a surface of the conductive fiber 284 with the finger, and an input mode may also be performed in which the user touches the surface of the conductive fiber 284 with the finger and separates the finger from the conductive fiber 284.

Figure 25:
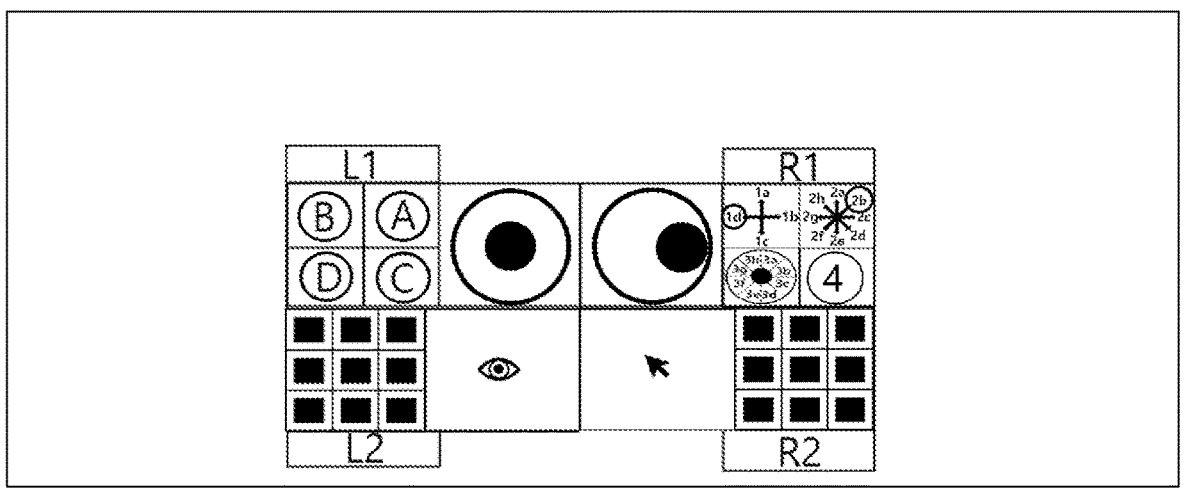
Figure 25:
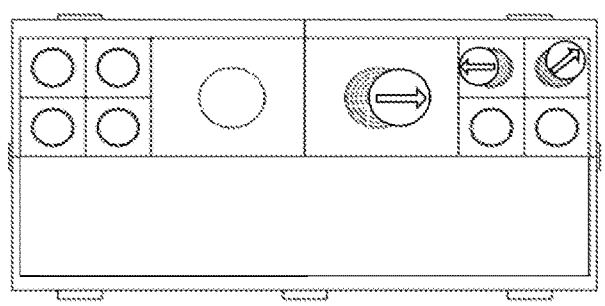
Figure 27:
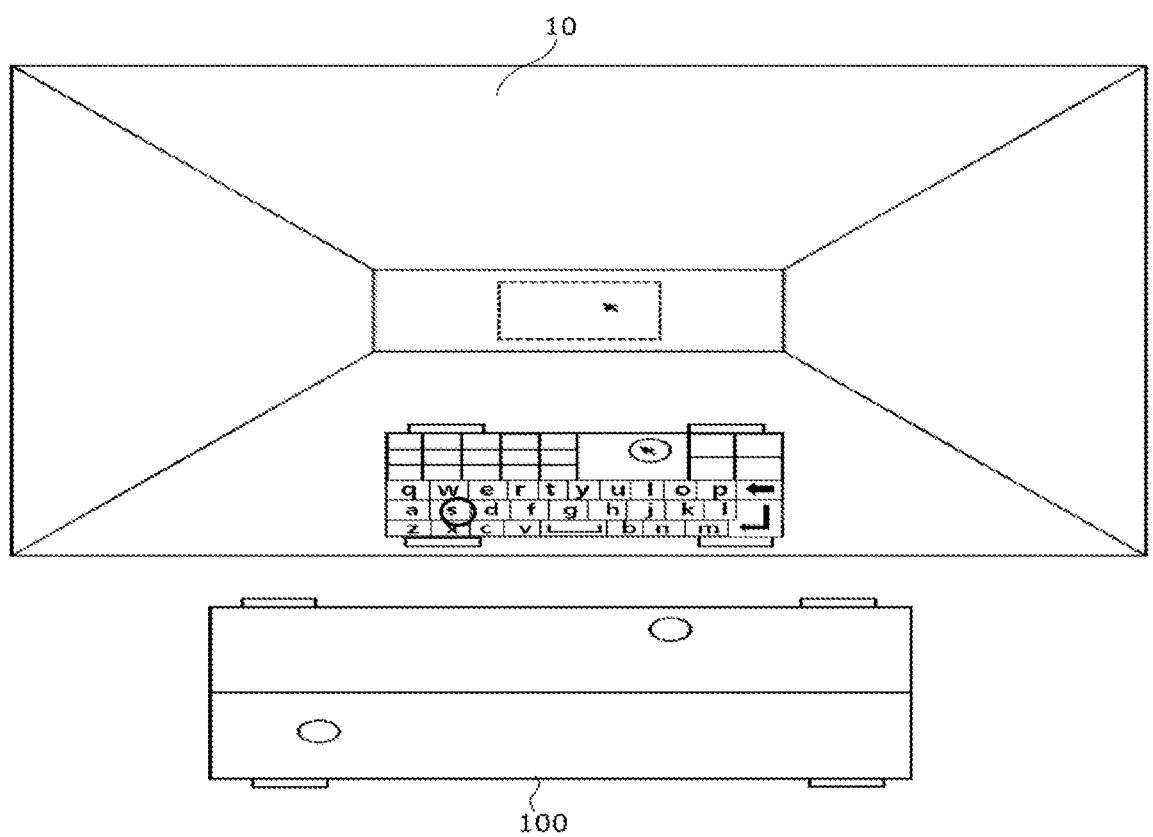

For example, as shown in FIG. 25, when the input of the second finger input mode (press) in which the index finger is pressed with a pressure greater than or equal to the set pressure is detected, sliding in the first finger input mode (touch) is detected when dragging to the right side, and thus the frequency of input errors can be reduced and various types of additional input values can be set so that the input apparatus can be used in a variety of ways to control and design 3D areas by inputting in a method, such as an immediate slide input, an input when separated after the slide, an input while the finger is separated as shown in FIG. 27, or the like in four directions, eight directions, in a circle, or the like with the finger rather than a single touch input in the second finger input mode (press) according to the system setting.

In addition, by using multi-touch, various input methods such as two-finger touch, two-finger double-touch, two-finger left and right and up and down drag, touch after two-finger drag, two-finger circle drag (90 degrees or more), two-finger spread (zoom in), two-finger pinch (zoom out), two-finger rotate, three-finger left and right and up and down drag, three-finger swipe and touch, three-finger circular swipe can be used.

In addition, when the user touches the conductive fiber 284 with the finger, a primary input mode may be performed, and when the user slidably moves the finger to another position while touching the surface of the conductive fiber 284 with the finger during using a keyboard mode, a secondary input mode (additional options for symbols, English lowercase letters, English uppercase letters, diphthongs, or the like) may be performed.

That is, when the user touches the touch input unit 200 with the finger with the set pressure or less to confirm the movement of a touch point shown through the display window of the electronic device in various directions, and the user presses the touch input unit 200 with the finger with the set pressure or more, various functions of the electronic device may be performed by an input operation of the finger input signal. In addition, when the user double-presses the surface of the conductive fiber 284 with the finger, the input mode may be performed, and when the user double-touches the surface of the conductive fiber 284, the input mode may be performed even when the user double-touches the surface of the conductive fiber 384 and the second touch is performed with the set pressure or less.

In addition, when the user touches the conductive fiber 284 of the touch input unit 200 with the finger in a preset pattern, virtual interfaces (a key input pattern, a joystick, a keyboard, a mouse, and the like) are visually displayed through the display window of the electronic device so that functions can be used, and as shown in FIG. 27, the functions of the keyboard and the mouse can be used simultaneously, and positions for inputting key buttons (letters, numbers, symbols functions, and the like) of the interface can be set in each seating area of the touch input unit 200.

Figure 24:
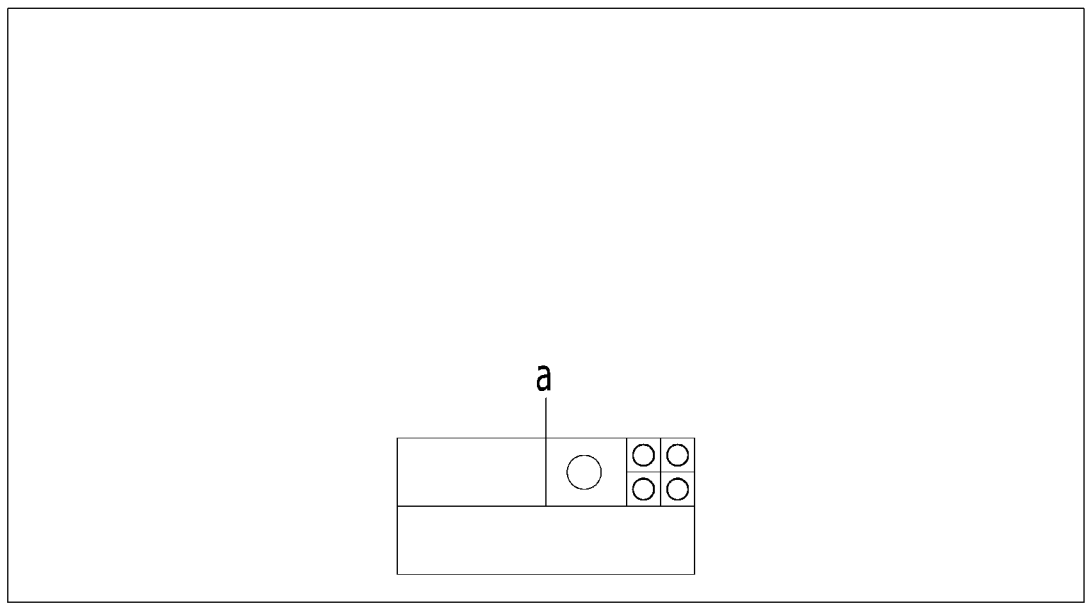
FIGS. 24 to 31 are views for showing usage examples of the input apparatus according to the first embodiment of the present disclosure.
Figure 24:
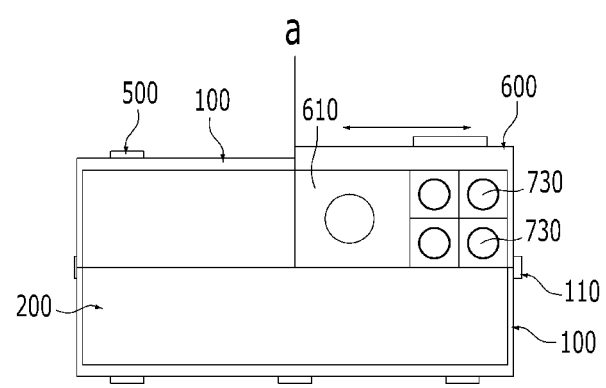

Meanwhile, when the mounting unit 600 is coupled to the base 100, as shown in FIG. 24, coordinates of the input area from a recognition point a of the mounting unit 600 may be set, and the input area may be displayed through the interface of the electronic device 10 according to the button arrangement of the auxiliary input unit 700.

In addition, as shown in FIG. 25, functions may be selected and performed with different combinations of inputs by sliding the auxiliary lifting rod 730 of the auxiliary input unit 700 after performing the touch or press input, function button variations and a combination of mouse and keyboard functions may be selected and performed by operation the input area of the touch input unit 200 and the function selection unit 500, and the input area and functions may be displayed with the lighting unit 20 when using the electronic device 10 (such as an AR device) that can visually confirm the input area and functions.

Figure 26:
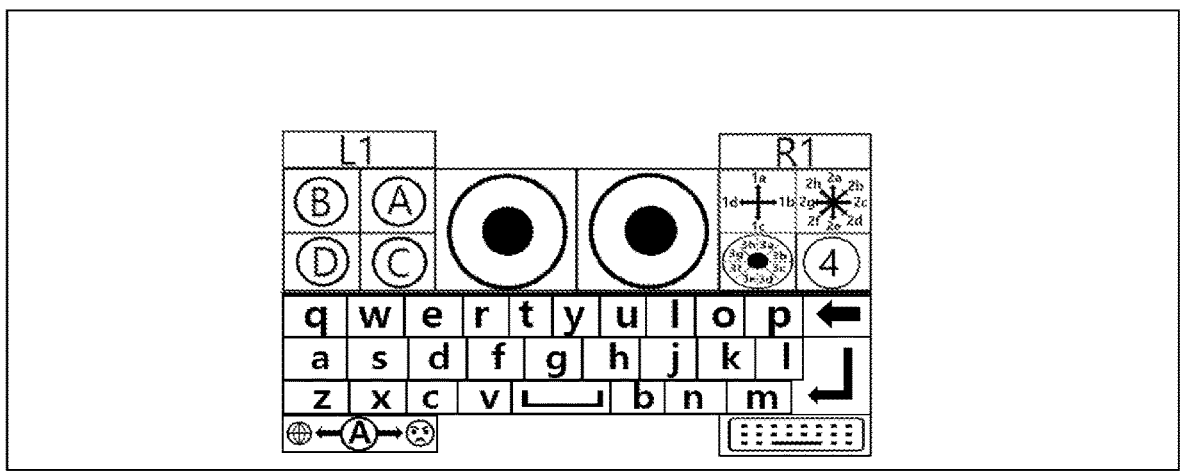
Figure 26:
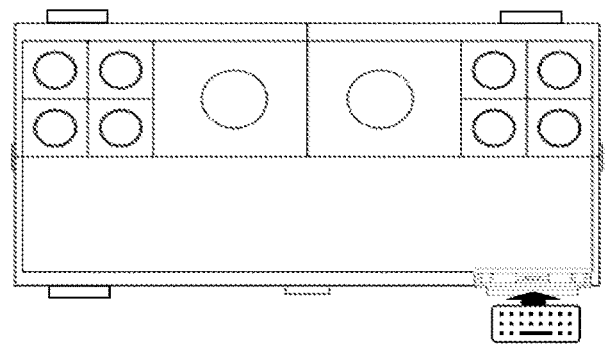

In addition, the function selection unit 500 may be changed to a press input set function (keyboard) as shown in FIG. 26, and by using the third touch sensor 530, various convenient functions may be performed, such as moving, zooming in and out of the interface page of the touch input unit 200 through left and right capacitive slide input and moving the home screen through pressing multiple buttons and the slide.

In addition, as shown in FIG. 27, multiple implementations of the input functions and options of the touch input unit 200 may be utilized to set and use input areas such as keyboard and mouse buttons, and the input position of the first finger input mode (touch) of the user may be displayed on the interface, and the functions may be performed in the Second finger input mode (press).

In addition, as shown in FIG. 28, by moving a beam pointer d of the gyro sensor 40, a mouse operation range a may be moved, and a mouse pointer c may be moved within the area of the mouse operating range a. Distance control by pulling or pushing forward the mouse operation range a by scrolling adjustment of (b) enables manipulation and control of the sense of distance in 3D virtual reality and augmented reality, and height control is possible in the same manner.

In addition, as shown in FIG. 29, the mouse operation range a of virtual space or augmented reality may be rotated in a direction of the operation range rotation function b to enable stereoscopic space remote manipulation, and the mouse operation range a may be moved in the direction of the operation range movement function c to enable multi-directional rotation and movement of the mouse operation range a, so that the manipulation and control of near-field stereoscopic space in the 3D virtual and augmented reality is possible from the user's perspective. By touching and moving left and right with the finger on a third conductive member 520 of the function selection unit 500, various forms of stereoscopic manipulation are possible depending on the program settings in conjunction with the motion sensing function of the gyro sensor 40, such as pulling and pushing the mouse operation range a and moving the finger up and down, as shown in FIG. 28.

Figure 30:
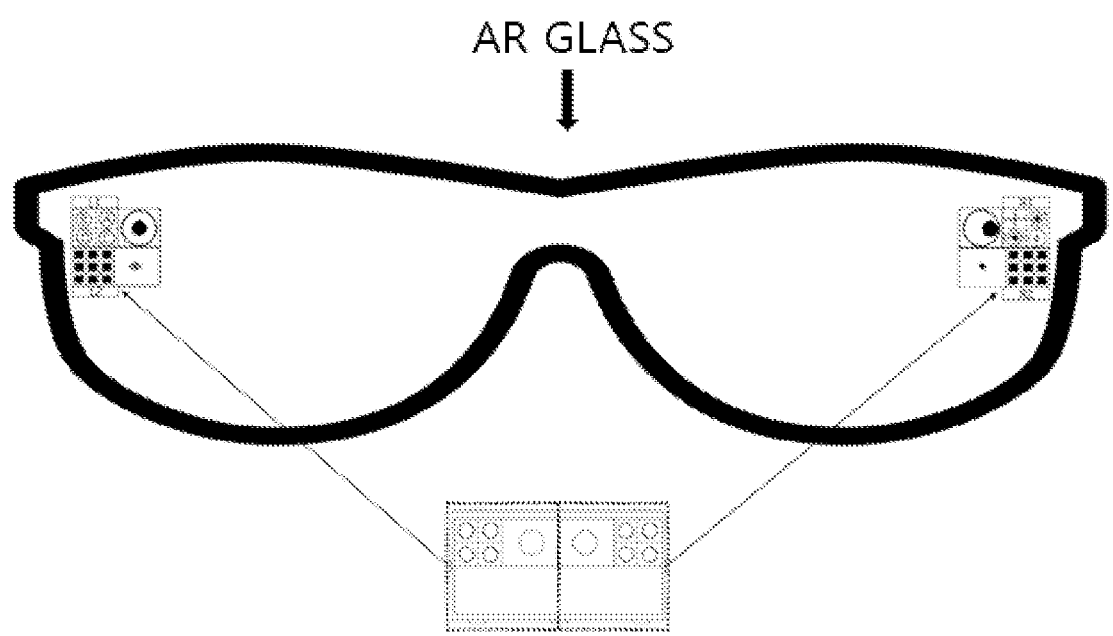
Figure 31:
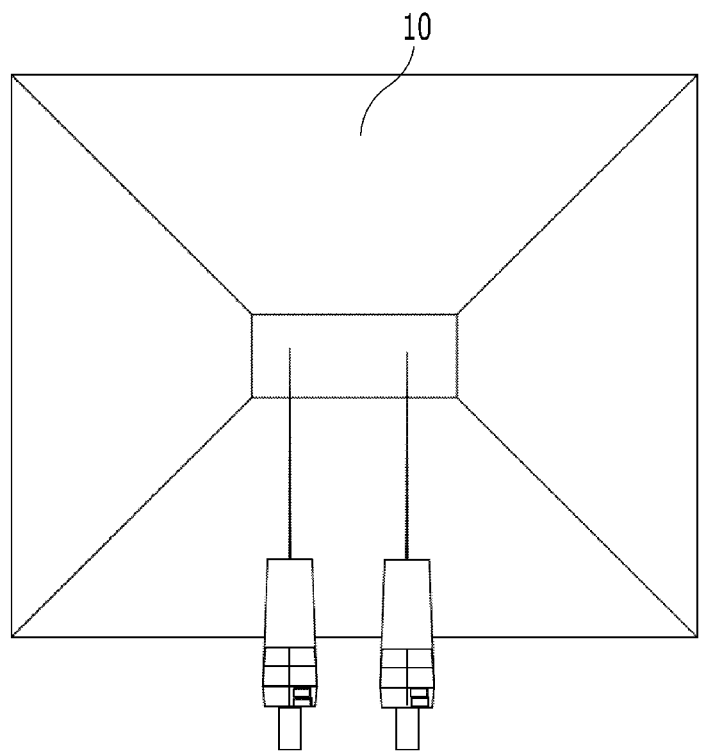

In addition, when using an AR glass as shown in FIG. 30, it is possible to check the interface function according to the user's convenience without blocking the field of view by splitting the interface left and right, moving, and zooming in and out, and when separating with a stick as shown in FIG. 31, a motion sensing function of the existing VR input apparatus may be used with the function of the bi-directional gyro sensor 40, and a free motion sensing input apparatus may be implemented more efficiently than before by combining the input area and function configuration or additional devices.

Hereinafter, a method of controlling an input apparatus according to a second embodiment of the present disclosure will be described with reference to FIG. 32. The method of controlling the input apparatus according to the second embodiment of the present disclosure includes a signal input operation (S100), a signal transmission operation (S200), and a function performing operation (S300).

The signal input operation (S100) is a process in which a finger input signal input through a touch input unit 200 is input to a control unit 300, and the finger input signal is input to the control unit 300 when a finger comes into contact with the touch input unit 200. The touch input unit 200 is provided in an installation groove 101 of a base 100 to form a finger touch area of a user, and detects the finger input signal in a capacitive manner when the finger is in contact therewith. Since the touch input unit 200 is provided in each of the bases 100, finger input signals of the user's left hand and right hand may be individually input.

In addition, in the signal input operation (S100), the touch input unit 200 may detect the finger input signal in a first finger input mode (touch) (capacitive manner) when the finger comes into contact (touch) therewith with a set pressure or less, detect the finger input signal in a second finger input mode (press) when the finger comes in contact (press) therewith with the set pressure or more, and detect a position of the finger through the finger input signal. That is, the user touches the touch input unit 200 with the finger with the set pressure or less to move a pointer shown through a display window of an electronic device 10 in various directions, and when the user presses the touch input unit 200 with the finger with the set pressure or more, various functions of the electronic device 10 may be performed by an input operation of the finger input signal.

The touch input unit 200 according to one embodiment of the present disclosure may include a first insulating plastic 210 provided on a lower surface of the installation groove 101, a first touch sensor 220 stacked and connected to an upper surface of the first insulating plastic 210, a first conductive member 230 stacked and connected to an upper surface of the first touch sensor 220, a second insulating plastic 240 made of a non-conductive material and stacked on an upper surface of the first conductive member 230, a plurality of lifting holes 250 vertically passing through the second insulating plastic 240, a conductive elastic pad 260 positioned within a thickness of the second insulating plastic 240 and having a plurality of elastic deformation areas 261 respectively positioned in the lifting holes 250 to be spaced apart from an upper portion of the first conductive member 230, a first operation unit 270 provided to be liftable in the lifting hole 250 and having a lower end that presses the elastic deformation area 261 downward to connect the elastic deformation area 261 to the upper surface of the first conductive member 230 when the first operation unit 270 descends to a lower connection position, and a conductive touch unit 280 positioned to be spaced apart from an upper portion of the second insulating plastic 240 and stacked and connected to an upper end of the first operation unit 270.

The first conductive member 230 may use an electroconductive plastic and may be horizontally installed in the form of a panel on the lower surface of the installation groove 101. The first touch sensor 220 may detect the movement of the finger in X-line and Y-line directions in an electrostatic manner, may be horizontally installed on the upper surface of the first conductive member 230, and may be electrically connected to the first conductive member 230 so that current may flow therebetween. Here, the first touch sensor 220 may detect the movement of the finger in the X-line and Y-line directions and transmit the detected movement to the control unit 300 to be described below.

The first conductive member 230 may use an electroconductive plastic, and may be horizontally installed in the form of a panel on the upper surface of the first touch sensor 220. The second insulating plastic 240 uses a non-conductive plastic material in which electricity is not conducted, and the second insulating plastic 240 may be horizontally installed in the form of a panel on the upper surface of the first conductive member 230 and may be electrically connected to the first conductive member 230 so that electricity may be conducted therebetween.

The lifting hole 250 is a space in which the first operation unit 270 to be described below is installed, and vertically passes through the second insulating plastic 240. Here, a lifting rod 271 to be described below is positioned to be liftable in the lifting hole 250, and an upper end of the lifting rod 271 to be described below protrudes from an upper portion of the lifting hole 250.

The conductive elastic pad 260 may use a conductive rubber material or the like having electrical conductivity, may be horizontally installed in the form of a panel within a thickness of the insulating plastic 240, and the plurality of elastic deformation areas 261 formed on the conductive elastic pad 260 may be respectively positioned in the lifting holes 250 to be spaced apart from the upper portion of the first conductive member 230.

Here, the elastic deformation areas 261 may be positioned in the lifting holes 250, respectively, and when the lifting rod 271 to be described below descends to the connection position, the elastic deformation area 261 is electrically connected to the upper surface of the first conductive member 230 by being convexly bent and deformed downwardly while being connected to the lifting rod 271. That is, when the user presses a conductive fiber to be described below with the finger with the set pressure or more to lower the lifting rod 271 to the connection position, a lower end of the lifting rod 271 is connected to an upper end of the elastic deformation area 261.

The first operation unit 270 is for detecting the contact (touch) of the finger, and is switched to the second finger input mode (press) in which the finger input signal is input when a pressure transmitted from the user's finger is greater than or equal to the set pressure.

The first operation unit 270 according to one embodiment of the present disclosure may include the lifting rod 271 positioned to be liftable on an upper portion of the elastic deformation area 261 and having a side portion from which a locking protrusion 271a protrudes, and configured to press the elastic deformation area 261 downward when descending to the connection position, a locking step 272 protruding from an inner circumferential surface of the lifting hole 250 and through which the lower end of the lifting rod 271 vertically passes, and an elastic member 273 provided between the locking step 272 and the locking protrusion 271a and configured to elastically support a lower end of the locking protrusion 271a upward.

The lifting rod 271 is provided in the lifting hole 250 to be liftable from the lower connection position and to an upper connection release position, the lower end of the lifting rod 271 is positioned to be liftable in the lifting hole 250, and the upper end of the lifting rod 271 is positioned while being in close contact with a lower surface of a first conductive elastic pad 281 to be described below. The lifting rod 271 as described above is lifted to the upper connection release position while being elastically supported by the elastic member 273, the locking protrusion 271a of the lifting rod 271 maintains the positionally locked state to an upper end of the lifting hole 250, and the lower end of the lifting rod 271 is positioned to be spaced apart from the upper portion of the elastic deformation area 261. On the other hand, when the user presses a conductive fiber 284 of the conductive touch unit 280 to be described below with the finger with the set pressure or more, the lifting rod 271 descends to the lower connection position, and the elastic member 273 is compressed downward by the lowering of the locking protrusion 271a.

The locking step 272 may protrude from the inner circumferential surface of the lifting hole 250, a through hole may vertically pass through the locking step 272 so that the lower end of the lifting rod 271 vertically passes through the through hole, and the lower end of the lifting rod 271 may be positionally locked when the lifting rod 271 is lifted to the connection release position. The elastic member 273 is coupled to an outside of the lifting rod 271, has a lower end seated on an upper end of the locking step 272, and has an upper end elastically supporting the lower end of the locking protrusion 271a upward. For example, when the lifting rod 271 descends to the connection position, the elastic member 273 is compressed downward, and when the lifting rod 271 is lifted to the connection release position, the elastic member 273 is stretched upward by its own elastic force, and the lifting rod 271 may be positioned in a lifted state by the elastic supporting force of the elastic member 273. Here, the elastic member 273 may have a coil spring shape surrounding the outside of the lifting rod 271.

The conductive touch unit 280 may include the first conductive elastic pad 281 positioned to be spaced apart from the upper portion of the second insulating plastic 240 and having a lower surface stacked and connected to the upper end of the lifting rod 271, a second touch sensor 282 stacked and connected to an upper surface of the first conductive elastic pad, a second conductive touch pad 283 stacked and connected to an upper surface of the second touch sensor 282, and the conductive fiber 284 stacked and connected to an upper surface of the second conductive touch pad 283 to form the finger touch area.

The first conductive elastic pad 281 may be manufactured using an elastic material so that a shape thereof can be horizontally restored by self-elastic force after being convexly bent and deformed downwardly when the user presses the first conductive elastic pad 281, and the first conductive elastic pad 281 may be manufactured using a material such as polyethyleneterephthalate (PET). Here, the lower surface of the first conductive touch pad 281 and the upper end of the lifting rod 271 may be attached to each other by a separate adhesive (reference numeral not shown).

The second touch sensor 282 may detect the movement of the finger in the X-line and Y-line directions in an electrostatic manner, may be horizontally installed on the upper surface of the first conductive elastic pad 281, and may be electrically connected to the first conductive elastic pad 281 so that electricity may be conducted therebetween. The second touch sensor 282 as described above may detect the movement of the finger in the X-line and Y-line directions and transmit the detected movement to the control unit 300 to be described below.

The second conductive touch pad 283 may be manufactured using an elastic material so that a shape thereof can be horizontally restored by self-elastic force after being convexly bent and deformed downwardly when the user presses the second conductive touch pad 283, and the first conductive elastic pad 281 may be manufactured using a conductive material such as PET.

The conductive fiber 284 is the part with which the user's finger comes into contact (touch), and the conductive fiber 284 may use a conductive yarn material in which a conductive material such as carbon or metal is included in a fiber in order to detect static electricity flowing through the finger of the user, and is horizontally coupled to an upper surface of the second conductive touch pad 283. Here, the conductive fiber 284 may horizontally cover the entire area above the installation groove 101.

In addition, the conductive fiber 284 may adjust the sensitivity of the second finger input mode (press) according to a thickness and an elastic force of the conductive fiber 284 by absorbing static electricity of the finger that touches finely as an input of the touch input unit 200 using a user's fingernail and using a soft touch for a long time, may be provided in the form suitable for a user's touch pressure and the purpose, and may detect the input of the user's fingers even when the user's fingers are not touched therewith by storing coordinates of the last touch of the user's finger.

The control unit 300 is provided inside the base 100, is connected to the electronic device by a communication module 310 by a wireless communication method, and transmits the finger input signal transmitted from the touch input unit 200 to the electronic device 10. Various input modes may be preset in the control unit 300 using the input methods of touching, pressing, and sliding, as well as contacting (touching), non-contacting, separating (raising), and the like.

For example, when the user touches the touch input unit 200 in a preset pattern by using the finger, the corresponding input mode may be executed through the display window of the electronic device 10. The input mode may utilize performing a function immediately upon touch during non-contact, performing a function immediately upon press during non-contact, performing a function after raising the press during non-contact, performing a function immediately upon press during touch, performing a function after raising the press during touch, and the following input methods may be used, for example, double touch, touch swipe, multi-touch, multi-touch rotation, multi-direction touch swipe, one-direction touch swipe, double press, press swipe, multi-press, multi-direction press swipe, one-direction press swipe, and the like.

In addition, a fingerprint detection unit (not shown) for inputting the fingerprint 21 of the user may be further electrically connected to the control unit 300, and the detection unit of the fingerprint detection unit (not shown) may be installed in a state of being exposed to the outer surface of the base 100. For example, the detection unit of the fingerprint detection unit may be horizontally positioned on the edge-side upper surface of the base 100, and the user may register the fingerprint or release a lock by bringing the finger into contact with the detection unit.

In addition, when the driving of the power supply unit 400 is turned on by using the function selection unit 500, a fingerprint recognition function of the fingerprint detection unit may be performed, and the control unit 300 may perform a function of registering and modifying the fingerprint and selectively store one or more fingerprints. In addition, when the user's fingerprint is input through a fingerprint detection unit, the fingerprint detection unit may be unlocked and switched to a usable state.

The power supply unit 400 is provided to be rechargeable or replaceable in each of the bases 100 to supply power to the control unit 300, a power supply state may be turned on/off by the operation of the function selection unit 500 to be described below, a charging terminal (not shown) may be electrically connected to the control unit 300 so that the power supply unit 400 may be charged, and the charging terminal may be exposed to the outside of the base 100. That is, the connector of the charging cable 30 may be connected to the charging terminal to charge the power supply unit 400.

One or more function selection units 500 may be provided on a side surface of the base 100 to be electrically connected to the control unit 300, and may transmit a selection signal to the control unit 300 when one or more pressing operations are performed, and a preset input mode may be selectively performed in the control unit 300 as the selection signal of the function selection unit 500 is input.

As shown in FIG. 10, the function selection unit 500 according to one embodiment of the present disclosure may include an operating groove concavely formed in the side of the base 100, a first connection terminal 510 provided on a front surface of the operating groove and electrically connected to the control unit 300, a third conductive member 520 of which a rear end is inserted in be slidably movable into the operating groove and the other end, which is opposite the rear end, protrudes from a side portion of the base 100, a third touch sensor 530 coupled to the rear end of the third conductive member 520, a third insulating plastic 540 coupled to a rear end of the third touch sensor 530, a second connection terminal 550 coupled to a rear end of the third insulating plastic 540 and connected to the first connection terminal 510 when moved to a connection position, and an elastic member 560 provided between the operating groove and the third insulating plastic 540 and elastically supporting the rear end of the third insulating plastic 540 to a connection release position.

The third conductive member 520 may use an electro-conductive plastic, and the elastic member 560 may have a coil spring shape of which both ends elastically support the operating groove and the rear end of the third insulating plastic 540, respectively. For example, when the user presses the third conductive member 520, the third conductive member 520 is moved backward while the elastic member 560 is compressed backward, and the first connection terminal 510 and the second connection terminal 550 may be connected.

For example, when the user touches the conductive fiber 284 with the finger with the set pressure or less, the first finger input mode (touch) is performed. In this case, static electricity transmitted to the conductive fiber 284 through the user's finger is transmitted to the second touch sensor 282, and the second touch sensor 282 detects a position at which the user's finger is touched and transmits the finger input signal to the control unit 300.

On the other hand, when a pressure with which the user presses the conductive fiber 284 with the finger is greater than or equal to the set pressure, the second finger input mode (press) is performed. In this case, a seating area of the conductive fiber 284 is convexly bent and deformed downwardly, and the second lifting rod 271 positioned in the corresponding seating area descends to the lower connection position.

In addition, at the same time that the lower end of the lifting rod 271 is connected to the upper end of the elastic deformation area 261, the elastic member 273 is compressed downward, and a lower end of the elastic deformation area 261 is connected to the upper surface of the first conductive member 230. At this time, a connection signal of the elastic deformation area 261 is transmitted to the first touch sensor 220, and the first touch sensor 220 senses a position where the user's finger touches and transmits the finger input signal to the control unit 300.

The method in which the user inputs the finger input signal with the finger may be applied in various ways, an input mode may be performed in which the user touches a surface of the conductive fiber 284 with the finger, and an input mode may be performed in which the user touches the surface of the conductive fiber 284 with the finger and separates (raises) the finger from the conductive fiber 284.

For example, when the input of the second finger input mode (press) in which the index finger is pressed with a pressure greater than or equal to the set pressure is detected, sliding in the first finger input mode (touch) is detected when dragging to the right side, and thus the frequency of input errors can be reduced and various types of additional input values can be set by inputting in a method, such as an immediate slide input, an input when separated (raised) after the slide, an input while the finger is separated (raised), or the like in four directions, eight directions, in a circle, or the like with the finger rather than a single touch input in the second finger input mode (press) according to the system setting.

In addition, by using multi-touch, various input methods such as two-finger touch, two-finger double-touch, two-finger left and right and up and down drag, touch after two-finger drag, two-finger circle drag (90 degrees or more), two-finger spread (zoom in), two-finger pinch (zoom out), two-finger rotate, three-finger left and right and up and down drag, three-finger swipe and touch, three-finger circular swipe can be used.

In addition, when the user touches the conductive fiber 284 with the finger, a primary input mode may be performed, and when the user slidably moves the finger to another position while touching the surface of the conductive fiber 284 with the finger, a secondary input mode (additional options for symbols, English lowercase letters, English uppercase letters, diphthongs, or the like) may be performed.

That is, the user touches the touch input unit 200 with the finger with the set pressure or less to move a pointer shown through a display window of an electronic device in various directions, and when the user presses the touch input unit 200 with the finger with the set pressure or more, various functions of the electronic device may be performed by an input operation of the finger input signal. In addition, when the user double-touches the surface of the conductive fiber 284 with the finger, the input mode may be performed, and when the user double-touches the surface of the conductive fiber 284, the input mode may be performed even when the user double-touches the surface of the conductive fiber 384 and the second touch is performed with the set pressure or less.

In addition, when the user touches the conductive fiber 284 of the touch input unit 200 in a preset pattern with the finger, a virtual interface (a key input pattern, a keyboard, or the like) may be visually shown through the display window of the electronic device 10, and positions for inputting key buttons (characters, numbers, symbols, and the like) of the interface may be set in each seating area of the touch input unit 200.

In addition, function buttons or the like displayed on the virtual interface may be arranged in various combinations as necessary, the function buttons may be changed to displayed input languages and various input values by sharing the input through the display window of the electronic device 10 using the touch input unit 200, and the size and input values of keyboard buttons may be adjusted in various ways depending on the user's convenience. In addition, in the virtual interface displayed through the display window of the electronic device 10, a shape of a user's hand may be displayed together, and the touch input area and function of the key button may be displayed by detecting the position of the device with the function of the gyro sensor in the virtual space. In addition, an input value such as a right-click of a mouse may be set by inputting to the function selection unit 500 while performing a mouse mode is running, a touch position of a pen may be confirmed in the first finger input mode in a state in which a field of view is blocked by using a stylus pen or the like used for the mobile, and a pen input is possible through the second finger input mode of a set pressure or more.

Next, in the signal transmission operation (S200), a control signal is generated by the control unit 300 according to the finger input signal input through the touch input unit 200, and then transmitted to the electronic device 10 by the communication module 310.

Various input modes may be preset in the control unit 300 by using the input methods of touch, press, and slide, as well as touch, non-contact, and separating (raising), and when the user touches the touch input unit 200 in a preset pattern with the finger, the corresponding input mode may be performed through the display window of the electronic device 10.

The input mode may utilize performing a function immediately upon touch during non-contact, performing a function immediately upon press during non-contact, performing a function after raising the press during non-contact, performing a function immediately upon press during touch, performing a function after raising the press during touch, and the following input methods may be used, for example, double touch, touch swipe, multi-touch, multi-touch rotation, multi-direction touch swipe, one-direction touch swipe, double press, press swipe, multi-press, multi-direction press swipe, one-direction press swipe, and the like.

Finally, in the function performing operation (S300), the function set in the electronic device 10 according to the control signal transmitted through the communication module 310 is displayed through the display window.

For example, when the user inputs the finger input signal with the finger in the signal input operation (S100) described above, a virtual interface (a key input pattern, a keyboard, or the like) may be visually displayed through the display window of the electronic device 10, and positions for inputting key buttons (characters, numbers, symbols, and the like) of the interface displayed through the display window may be set in each seating area of the touch input unit 200.

In addition, when the user selects a keyboard function by touching or pressing the touch input unit 200 with the finger, a keyboard shape may be displayed through the display window of the electronic device 10. The key buttons and the like of the keyboard may be arranged in various combinations as necessary, may be changed according to a displayed input language and various set input values by visually sharing the input through the display window of the electronic device by using the touch input unit 200, and may be adjusted in size and input values in various ways to the user's convenience.

In addition, the method of controlling the input apparatus according to the second embodiment of the present disclosure may further include a mounting unit coupling operation (S400) of electrically connecting an auxiliary input unit 700 and the control unit 300 by coupling a mounting unit 600 having the auxiliary input unit 700 to the base 100, an indirect input signal input operation (S500) of inputting an indirect input signal to the control unit 300 when the auxiliary input unit 700 is operated, an indirect input signal transmission operation (S600) of generating a control signal by the control unit 300 according to the input indirect input signal and then transmitting the indirect input signal to the electronic device 10 by the communication module 310, and an optional function performing operation (S700) of displaying a function set in the electronic device 10 through the display window according to the transmitted indirect input signal.

In the mounting unit coupling operation (S400), the mounting unit 600 includes a gripping groove 601 formed on a front surface so that the base 100 is correspondingly inserted thereto, and when the base 100 is inserted into the gripping groove 601, an upper body 610 formed on an upper portion of the gripping groove 601 is positioned on an upper surface of the base 100. At this time, the upper body 610 may be positioned in a seated state on an upper end of an edge side of the base 100 so that a lower end of an edge side of the upper body 610 does not come into contact with the touch input unit 200.

In addition, the input apparatus according to one embodiment of the present disclosure may further include a lower slide groove 130 concavely formed in a lower surface of each of the bases 100, having a length in the axial direction of the hinge part 110, and having one side or both sides in the longitudinal direction open in the axial direction of the hinge part 110, a lower slide protrusion 620 protruding upward from a lower surface of the gripping groove 601 so as to be inserted into the lower slide groove 130 correspondingly and slidably coupled to the lower slide groove 130 through one side in the longitudinal direction in a male-female manner, a pair of vertical separation prevention grooves 131 concavely formed respectively in both sides of the lower slide groove 130 in the width direction, and a pair of vertical separation prevention protrusions 621 protruding respectively from both sides of the lower slide protrusion 620 in the width direction so as to be inserted into the vertical separation prevention grooves 131 in a male-female manner.

Next, the indirect input signal input operation (S500) is a process in which the indirect input signal is input to the control unit 300 when the auxiliary input unit 700 is operated, and the auxiliary input unit 700 is provided on an upper portion of the upper body 610 to form a seating area for a human body (such as the finger), and when the human body is seated, it transmits the indirect input signal to the touch input unit 200 by an electrostatic method.

Here, the auxiliary input unit 700 may include a lifting space 710 concavely formed below the upper body 610, an auxiliary lifting hole 720 vertically passing through the upper body 610 and having a lower portion connected to the lifting space 710, an auxiliary lifting rod 730 provided in the auxiliary lifting hole 720 to be liftable, horizontally movable, and horizontally rotatable and having a lower end connected to the conductive touch unit 280 described above when descending to the connection position, a lower auxiliary locking protrusion 740 that laterally protrudes from a lower end of the auxiliary lifting rod 730 to be positioned in the lifting space 710, and is positionally locked on an upper surface of the lifting space 710 when the auxiliary lifting rod 730 is lifted to a connection release position, a support panel 750 seated on an upper surface of the upper body 610 to be horizontally movable and having an upper fastening hole 751 vertically passing therethrough so that the auxiliary lifting rod 730 vertically passes through the upper fastening hole 751, an upper auxiliary locking protrusion 760 laterally protruding from an upper end of the auxiliary lifting rod 730 to be positioned to be spaced apart (raised) from an upper portion of the support panel 750, and a first auxiliary elastic member 770 provided between the support panel 750 and the upper auxiliary locking protrusion 760 and configured to elastically support the lower end of the upper auxiliary locking protrusion 760 upward so that the auxiliary lifting rod 730 is lifted and returned to the connection release position.

In addition, an accommodation groove 780 concavely formed in an upper surface of the support panel 750 and having an upper fastening hole 751 positioned in an inner area thereof may be further included. In this case, the first auxiliary elastic member 770 may be positioned inside the accommodation groove 780, and may elastically support a lower surface of the accommodation groove 780 and a lower end of the upper auxiliary locking protrusion 760 in a vertical direction. The upper auxiliary locking protrusion 760 may further include a conductive rubber 790 that is liftable in the inner area of the accommodation groove 780, coupled to the upper surface of the support panel 750 to cover an upper portion of the accommodation groove 780, and provided to allow a pressing operation to be performed thereon. Here, the first auxiliary elastic member 770 may have a coil spring shape surrounding an outside of the auxiliary lifting rod 730.

The input apparatus according to one embodiment of the present disclosure may include a guide groove 810 concavely formed along an inner circumferential surface of the auxiliary lifting hole 720, a sliding panel 820 having a disk shape, provided in the guide groove 810 to be horizontally movable, and having a lower fastening hole 821 vertically passing therethrough so that the auxiliary lifting rod 730 vertically passes through the lower fastening hole 821, and a second auxiliary elastic member 830 provided in the guide groove 810, spirally wound around the auxiliary lifting rod 730, and configured to elastically support an outer circumferential surface of the sliding panel 820 in a direction of the auxiliary lifting rod 730.

One or more auxiliary lifting holes 720 may be formed in the upper body 610, and the number, interval, and the like of the auxiliary lifting holes 720 may be variously applied as necessary. The guide groove 810 is a space in which the sliding panel 820 horizontally moves, an edge of the sliding panel 820 may be horizontally inserted into the guide groove 810, and the sliding panel 820 may be freely moved in a 360-degree direction while being inserted into the guide groove 810.

For example, when the auxiliary lifting rod 730 is pressed to the lower connection position, the first auxiliary elastic member 770 is compressed downward and the lower end of the auxiliary lifting rod 730 is connected to an upper surface of the conductive fiber 284, and when the auxiliary lifting rod 730 is released from pressing, the auxiliary lifting rod 730 may be lifted and returned to the connection release position by a compressive elastic force of the first auxiliary elastic member 770.

In addition, when the auxiliary lifting rod 730 is pushed to the lower connection position and then horizontally moved, the sliding panel 820 may be freely moved in the 360-degree direction in a state in which the sliding panel 820 is inserted into the guide groove 810, and the support panel 750 may be horizontally moved together with the auxiliary lifting rod 730 while being seated on the upper surface of the upper body 610. In this case, the second auxiliary elastic member 830 may allow the auxiliary lifting rod 730 to move horizontally by being compressed in a moving direction of the auxiliary lifting rod 730, and when the human body (the finger or the like) is separated (raised) from the upper end of the auxiliary lifting rod 730, the auxiliary lifting rod 730 and the sliding panel 820 may be elastically returned to their original positions by a self-elastic force of the second auxiliary elastic member 830.

That is, the indirect input signal may be transmitted to the touch input unit 200 by using the auxiliary input unit 700 in a state in which the mounting unit 600 is coupled to the base 100, and various indirect input signals may be transmitted to the touch input unit 200 by using the auxiliary input unit 700 applied in various forms, thereby enabling various optional functions (console game machine, steering wheel, gaming gun, or the like) to be performed.

Next, in the indirect input signal transmission operation (S600), a control signal is generated by the control unit 300 according to the input indirect input signal, and then the indirect input signal is transmitted to the electronic device 10 by the communication module 310. At this time, the indirect input signal is input to the touch input unit 200 through the auxiliary input unit 700, and the control signal is generated by the control unit 300 according to the indirect input signal input through the touch input unit 200, and the control signal is transmitted to the electronic device 10 by the communication module 310.

Finally, in the optional function performing operation (S700), the function set in the electronic device 10 according to the transmitted indirect input signal is displayed through the display window. For example, when the user inputs the indirect input signal in the above-described indirect input signal operation (S500), virtual interfaces (a key input pattern, a keyboard, and the like) may be visually displayed through the display window of the electronic device 10, and various indirect input signals may be transmitted to the touch input unit 200 using the auxiliary input unit 700, so that various optional functions (a console game machine, a steering wheel, a gaming gun, and the like.) may be performed through the display window of the electronic device 10.

As a result, the present disclosure can be used in various electronic devices such as virtual reality, augmented reality, and screen devices by inputting a finger input signal using a touch input unit, and can satisfy the requirements with convenience, wide use, and portability since various input apparatuses can be implemented due to the modifications caused by the combination of an auxiliary input unit, and a motion sensing function can be used to control a 3D three-dimensional space, enabling the use of a flexible and variable input method according to the program included in the meta universe and enabling input methods to be selected according to various devices, programs, and users, the present disclosure can be used in various electronic devices such as virtual reality, augmented reality, and screen devices by inputting the finger input signal using the touch input unit, and can satisfy the requirements with convenience, wide use, and portability since various input apparatuses can be implemented due to the modifications caused by the combination of the auxiliary input unit, and 3D stereoscopic space can be controlled by utilizing the motion sensing function, which is flexible according to the programs included in the meta universe, and variable input methods can be selected according to various devices, programs, and users.

The present disclosure can be used in various electronic devices such as virtual reality, augmented reality, and screen devices by inputting a finger input signal using a touch input unit, and can satisfy the requirements with convenience, wide use, and portability since various input apparatuses can be implemented due to the modifications caused by the combination of an auxiliary input unit, and a motion sensing function can be used to control a 3D three-dimensional space, enabling the use of a flexible and variable input method according to the program included in the meta universe and enabling input methods to be selected according to various devices, programs, and users.

Although the input device and the method of controlling the same according to the present disclosure have been described above, it is apparent that various embodiments are possible without departing from the scope of the present disclosure.

Therefore, the scope of the present disclosure is not limited to the described embodiments, and should be defined by the claims as well as the scope of the claims which will be described below.

In other words, it should be understood that the above-described embodiments are illustrative in all respects and are not intended to limit the present disclosure to the above-described embodiments, and the scope of the present disclosure is in the claims described later rather than the detailed description described above. All changes or modifications derived from the meaning and scope of the claims and equivalent concepts should be construed as being included in the scope of the present disclosure.

What is claimed is:

1. An input apparatus comprising:
   a pair of bases having one sides facing each other and rotatably coupled by a hinge part, which forms a horizontal rotation center, and each having an installation groove formed in an upper surface;
   a touch input unit provided in the installation groove to form a finger touch area of a user and configured to detect a finger input signal in a capacitive manner when a finger comes into contact therewith;

a control unit provided in each of the bases, connected to an electronic device by a communication module, and configured to transmit the finger input signal to the electronic device;

a power supply unit provided in each of the bases to be rechargeable or replaceable and configured to supply power to the control unit;

a plurality of function selection units provided on a side surface of each of the bases, electrically connected to the control unit, and configured to transmit a selection signal to the control unit when one or more pressing operations are performed;

one or more mounting units each having a gripping groove formed on a front surface to allow the base to be correspondingly inserted, and an upper body formed on an upper portion of the gripping groove and positioned on an upper surface of the base when the base is inserted into the gripping groove; and one or more auxiliary input units provided on an upper portion of the upper body to form a seating area of a human body, and configured to transmit an indirect input signal to the touch input unit by an electrostatic method when the human body is seated thereon, wherein the touch input unit includes:

a first insulating plastic provided on a lower surface of the installation groove;

a first touch sensor stacked and connected to an upper surface of the first insulating plastic;

a first conductive member stacked and connected to an upper surface of the first touch sensor;

a second insulating plastic made of a non-conductive material and stacked on an upper surface of the first conductive member;

a plurality of lifting holes vertically passing through the second insulating plastic;

a conductive elastic pad positioned within a thickness of the second insulating plastic and having a plurality of elastic deformation areas respectively positioned in the lifting holes to be spaced apart from an upper portion of the first conductive member;

a first operation unit provided to be liftable in the lifting hole and having a lower end that presses the elastic deformation area downward to connect the elastic deformation area to the upper surface of the first conductive member when the first operation unit descends to a lower connection position; and a conductive touch unit positioned to be spaced apart from an upper portion of the second insulating plastic and stacked and connected to an upper end of the first operation unit.

2. The input apparatus of claim 1, wherein the first operation unit includes:

a lifting rod positioned on an upper portion of the elastic deformation area to be liftable, having a side portion from which a locking protrusion protrudes, and configured to press the elastic deformation area downward when descending to the connection position;

a locking step protruding from an inner circumferential surface of the lifting hole and through which a lower end of the lifting rod vertically passes; and an elastic member provided between the locking step and the locking protrusion and configured to elastically support a lower end of the locking protrusion upward, and the conductive touch unit includes:

a first conductive touch pad positioned to be spaced apart from the upper portion of the second insulating plastic and having a lower surface stacked and connected to an upper end of the lifting rod;

a second touch sensor stacked and connected to an upper surface of the first conductive touch pad;

a second conductive touch pad stacked and connected to an upper surface of the second touch sensor; and a conductive fiber stacked and connected to an upper surface of the second conductive touch pad to form the finger touch area.

3. The input apparatus of claim 1, wherein the auxiliary input unit includes:

a lifting space concavely formed below the upper body;

an auxiliary lifting hole vertically passing through the upper body and having a lower portion connected to the lifting space;

an auxiliary lifting rod provided in the auxiliary lifting hole to be liftable, horizontally movable, and horizontally rotatable, and having a lower end connected to the conductive touch unit when descending to the connection position;

a lower auxiliary locking protrusion that laterally protrudes from the lower end of the auxiliary lifting rod to be positioned in the lifting space, and is positionally locked on an upper surface of the lifting space when the auxiliary lifting rod is lifted to a connection release position;

a support panel seated on an upper surface of the upper body to be horizontally movable, and having an upper fastening hole vertically passing therethrough so that the auxiliary lifting rod vertically passes through the upper fastening hole;

an upper auxiliary locking protrusion laterally protruding from an upper end of the auxiliary lifting rod and positioned to be spaced apart from an upper portion of the support panel; and a first auxiliary elastic member provided between the support panel and the upper auxiliary locking protrusion, and configured to elastically support a lower end of the upper auxiliary locking protrusion upward so that the auxiliary lifting rod is lifted and returned to the connection release position.

4. The input apparatus of claim 3, further comprising an accommodation groove concavely formed in an upper surface of the support panel and having an upper fastening hole positioned in an inner area thereof, wherein the first auxiliary elastic member is positioned inside the accommodation groove, and elastically supports a lower surface of the accommodation groove and the lower end of the upper auxiliary locking protrusion in a vertical direction.

5. The input apparatus of claim 4, wherein the upper auxiliary locking protrusion further includes a conductive rubber that is lifted in the inner area of the accommodation groove, coupled to the upper surface of the support panel to cover an upper portion of the accommodation groove, and provided to be elastically deformable to allow a pressing operation to be performed thereon.

6. The input apparatus of claim 3, further comprising:

a guide groove concavely formed along an inner circumferential surface of the auxiliary lifting hole;

a sliding panel having a disk shape, provided in the guide groove to be horizontally movable, and having a lower fastening hole vertically passing therethrough so that the auxiliary lifting rod vertically passes through the lower fastening hole; and a second auxiliary elastic member provided in the guide groove, spirally wound around the auxiliary lifting rod, and configured to elastically support an outer circumferential surface of the sliding panel in a direction of the auxiliary lifting rod.

7. The input apparatus of claim 1, further comprising:
a lower slide groove concavely formed in a lower surface of each of the bases, having a length in an axial direction of the hinge part, and having one side or both sides in a longitudinal direction open in the axial direction of the hinge part;
a lower slide protrusion protruding upward from a lower surface of the gripping groove so as to be correspondingly inserted into the lower slide groove, and slidably coupled to the lower slide groove through the one side in a longitudinal direction in a male-female manner;
a pair of vertical separation prevention grooves concavely formed respectively in both sides of the lower slide groove in a width direction; and
a pair of vertical separation prevention protrusions protruding respectively from both sides of the lower slide protrusion in the width direction so as to be inserted into the vertical separation prevention grooves in a male-female manner.

8. The input apparatus of claim 1, further comprising:
a side slide groove that is concavely formed in each of the one sides of the bases facing each other, has a length in an axial direction of the hinge part, and has one side or both sides in a longitudinal direction open in the axial direction of the hinge part; and
a pair of horizontal separation prevention grooves concavely formed respectively in both sides of the side slide groove in a width direction,
wherein the hinge part further includes:
a first rotating member having a first gear that is provided to be rotatable around the horizontal rotation center and has a length in an axial direction, and a first side slide protrusion that is connected to one side of the first gear in a width direction, has a length in the axial direction of the first gear, and is slidably coupled to the side slide groove through the one side in the longitudinal direction in a male-female manner;
a second rotating member having a second gear that is provided to be rotatable around the horizontal rotation center so as to be rotated by being engaged with the first gear and has a length in an axial direction, and a second side slide protrusion that is connected to one side of the second gear in a width direction, has a length in the axial direction of the second gear, and is slidably coupled to the side slide groove through the other side in the longitudinal direction in a male-female manner;
a pair of first horizontal separation prevention protrusions protruding from both sides of the first side slide protrusion in a width direction so as to be inserted into the horizontal separation prevention grooves, respectively, in a male-female manner; and
a pair of second horizontal separation prevention protrusions protruding from both sides of the second side slide protrusion in a width direction so as to be inserted into the horizontal separation prevention grooves, respectively, in a male-female manner.

9. The input apparatus of claim 8, further comprising an auxiliary mounting unit on which one of the bases is mounted,
wherein the auxiliary mounting unit includes:
a mounting hole having a length at both sides thereof;
a mounting groove concavely formed in an upper surface of the mounting hole so that the base is correspondingly inserted thereto and having a front surface and one side surface open;
an auxiliary mounting protrusion that protrudes upward from a lower surface of the mounting groove, has a length in a front-back direction, and is slidably coupled to the side slide groove through the one side in the longitudinal direction in a male-female manner; and
an operation switch operably provided on a rear surface of the mounting hole, and electrically connected to the control unit when the base is coupled to the mounting groove.

10. A method of controlling an input apparatus, the method comprising:
a signal input operation of inputting a finger input signal to a control unit when a finger comes into contact with a touch input unit provided on an upper surface of a base;
a signal transmission operation of generating a control signal by the control unit according to the finger input signal, and then transmitting the control signal to an electronic device by a communication module; and
a function performing operation of displaying a function set in the electronic device through a display window according to the transmitted control signal,
wherein the touch input unit detects the finger input signal in a first finger input mode (touch) when being touched by the finger of a user with a set pressure or less, and detects the finger input signal in a second finger input mode (press) when being in contact with the finger with the set pressure or more.

11. The method of claim 10, further comprising:
a mounting unit coupling operation of electrically connecting an auxiliary input unit and the control unit by coupling a mounting unit having the auxiliary input unit to the base;
an indirect input signal input operation of inputting an indirect input signal to the control unit when the auxiliary input unit is operated;
an indirect input signal transmission operation of generating the control signal by the control unit according to the input indirect input signal and then transmitting the indirect input signal to the electronic device by the communication module; and
an optional function performing operation of displaying the function set in the electronic device through the display window according to the transmitted indirect input signal.

* * * * *